United States Patent [19]

Vornberger et al.

[11] E Re. 30,646

[45] Reissued Jun. 16, 1981

[54] CEMENT SIDE AND HEEL LASTING MACHINE

[75] Inventors: Walter Vornberger, Tewksbury, Mass.; Karl F. Vornberger, Amherst, N.H.

[73] Assignee: International Shoe Machine Corporation, Nashua, N.H.

[21] Appl. No.: 25,695

[22] Filed: Apr. 2, 1979

Related U.S. Patent Documents

Reissue of:

[64] Patent No.: 4,082,060
Issued: Apr. 4, 1978
Appl. No.: 762,685
Filed: Jan. 26, 1977

[51] Int. Cl.[3] ..... B05C 3/02; B05C 11/00; A43D 21/00

[52] U.S. Cl. ..... 118/411; 12/10.5; 118/407

[58] Field of Search ..... 12/10, 10.1, 10.5; 118/411, 410, 407; 427/284; 252/465, 46, 46 J; 208/10

[56] References Cited

U.S. PATENT DOCUMENTS

| | | | |
|---|---|---|---|
| 1,404,200 | 1/1922 | Grush | 252/465 |
| 3,901,181 | 8/1975 | Vornberger | 118/411 |
| 3,962,741 | 6/1976 | Vornberger | 12/10.5 |
| 3,963,840 | 6/1976 | Vornberger | 427/284 |
| 4,082,060 | 4/1978 | Vornberger et al. | 118/411 |

*Primary Examiner*—Patrick D. Lawson
*Attorney, Agent, or Firm*—Albert Gordon

[57] ABSTRACT

A machine, operable on a shoe assembly formed of a last having an upper mounted thereon and an insole located on its bottom, that applies cement in the corners between the side and heel portions of the upper margin and the peripheries of the corresponding portions of the insole prior to wiping the side and heel portions of the upper margin against the insole and attaching the wiped margin portions to the insole by means of the cement. The machine includes an arrangement for automatically lowering cement applying nozzles against the desired portion of the insole regardless of the length of the shoe assembly, an arrangement for automatically positioning heel and side wiping instrumentalities so as to enable these instrumentalities to simultaneously operate on the side and heel portions of the shoe assembly regardless of the length of the shoe assembly, and a mechanism for applying substantially uniform quantities of cement from the nozzles onto surfaces of the shoe assembly during the entire movements of the nozzles along these surfaces.

11 Claims, 37 Drawing Figures

CEMENT SIDE AND HEEL LASTING MACHINE

Matter enclosed in heavy brackets [ ] appears in the original patent but forms no part of this reissue specification; matter printed in italics indicates the additions made by reissue.

BACKGROUND AND SUMMARY OF THE INVENTION

This invention is an improvement on cement lasting machines of the type shown in U.S. Pat. No. 3,963,840.

Dealing with a first aspect of the invention, the prior art machine is operable on a shoe assembly formed of a last having an insole located on its bottom and an upper mounted thereon with the toe portion of the upper margin being wiped against and secured to the insole and unwiped portions of the upper margin extending heelwardly of the wiped toe portion of the upper margin. The machine applies cement in the corners between the unwiped margin portions and the corresponding portions of the insole periphery. The machine includes a shoe assembly support for supporting the shoe assembly bottom-up with the toe end of the shoe assembly facing forwardly. A pair of nozzles, located above the shoe assembly, are mounted for forward-rearward movement, for heightwise movement, and for inward-outward movement. In order to apply cement into the corners heelwardly from the boundaries between the wiped and unwiped margin portions, the nozzles are caused to move forwardly while they are in upper and inner positions until an engaging member, that is mounted for forward-rearward movement with the nozzles, intersects a stop member. The stop member is so located as to stop the forward movement of the nozzles when the nozzles are over the widest part of the shoe assembly bottom heelwardly of said boundaries. After the stop member stops forward movement of the nozzles, the nozzles are lowered and moved outwardly into the corners heelwardly of said boundaries. The stop member is then moved out of intersecting relationship with the engaging member so that the nozzles can again resume their forward movement so as to bring the nozzles to said boundaries. When the nozzles have arrived at said boundaries, they are caused to move rearwardly while being maintained in said corners and cement is extruded from the nozzles into the corners during this rearward movement. In order to properly stop the first mentioned forward movement of the nozzles in the appropriate position for the particular length of shoe being operated on, the forward-heelward location of the stop member is manually adjusted.

A first object of the first aspect of the invention is to do away with the manual adjustment of the forward-rearward location of the stop member when changing the length of the shoe assembly being operated on by the machine. To accomplish this, the machine, in accordance with the first aspect of the invention, includes a detector member mounted for forward-rearward movement that is so connected to the stop member as to cause the stop member to have forward-rearward movement in unison with the detector member. The detector member is initially located in a forward position that is toeward of the toe end extremity of the shoe assembly and is yieldably moved rearwardly, together with the stop member, prior to the first mentioned forward movement of the nozzles to bring the detector member into engagement with the toe and extremity of the shoe assembly and thereby bring the stop member to the desired location for the particular length of shoe assembly being operated on. *In its broadest sense, this object of the invention has utility in organizations wherein the stop member does not stop the forward movements of the nozzles when the nozzles are over the widest part of the shoe assembly bottom heelwardly of said boundaries but only stops the forward movements of the nozzles when the nozzles arrive at said boundaries regardless of whether the nozzles are extruding cement into the corners when the nozzles are moving heelwardly away from the boundaries or toewardly towards the boundaries.*

A second object of the first aspect of the invention is to provide an improved arrangement for moving the stop member out of intersecting relationship with the engaging member after the engaging member has intersected the stop member to stop the first mentioned forward movement of the nozzles and for stopping the resumed forward movement of the nozzles when the nozzles have arrived at said boundaries. This is accomplished by mounting the stop member to a housing for forward movement from a rearward stop member position which is the position the stop member assumes when the engaging member engages the stop member to stop the first mentioned forward movement of the nozzles and a forward stop member position that is in intersecting relationship with the engaging member. After the stop member, in its rearward stop member position, has been engaged by the engaging member to stop the forward movement of the nozzles and the nozzles have been moved into said corners, the stop member is moved to its forward stop member position to permit resumption of the forward movement of the nozzles until the engaging member again intersects the stop member, the parts being so related that the second intersection of the engaging member with the stop member takes place when the nozzles have arrived at said boundaries.

[Dealing with a second aspect of the invention, in the operation of the prior art machine, the unwiped portions of the upper margin are the side and heel portions. The prior art machine includes a slide plate, located rearwardly of the support, mounted for forward-rearward movement. Heel wiping means are mounted to the slide plate for forward movement with respect to the slide plate in a heel wiping stroke from a retracted position wherein the heel wiping means is in a position in readiness for wiping to an advanced position wherein the heel wiping means has wiped the heel portion of the upper margin against the corresponding portion of the insole periphery. A shoe assembly engaging member is mounted to the slide plate below the heel wiping means. A side wiping means is located on each side of the support, each side wiping means being mounted for inward movement from a position of disengagement with the shoe assembly through a side wiping stroke to an inner position wherein the side wiping means has wiped a side portion of the upper margin against a corresponding portion of the insole periphery. The slide plate is initially maintained in its rearward position, the heel wiping means is initially maintained in its retracted position, and the side wiping means are initially maintained in their positions of disengagement. Thereafter, the slide plate is moved forwardly until the shoe assembly engaging member engages the heel and extremity of the shoe assembly. This is followed by the imparting of inward movements of each side wiping means from its position of disengagement through a side wiping stroke and outward movement of each side wiping means back to its position of disengagement. After the side wiping means have returned to their positions of disengagement, a heel wiping stroke is imparted to the heel wiping means.]

[In the prior art machine, the wiping strokes are imparted sequentially to the side and heel wiping means because there is some overlap in the upper margin portions engaged by the side wiping means and the heel wiping means and it is necessary to have the side wiping means returned to their positions of disengagement prior to the imparting of the heel wiping stroke to prevent undesired interference between the side wiping means and the heel wiping means during the side wiping strokes and the heel wiping stroke. It is, however, desirable to have the side and heel wiping strokes take place simultaneously in order to minimize the time of the operating cycle of the machine in operating on a shoe assembly.]

[In accordance with the second aspect of this invention, the prior art machine has been modified so as to enable the side wiping strokes and the heel wiping stroke to automatically take place simultaneously regardless of the length of the shoe assembly and the position of engagement of the shoe assembly engaging member with the heel end extremity of the shoe assembly. This is accomplished by mounting each side wiping means for forward-rearward movement and by so connecting each side wiping means to the slide plate as to cause forward movement of both side wiping means concomitantly with the forward movement of the slide plate.]

Dealing with a [third] *second* aspect of the invention, each nozzle of the prior art machine is mounted for movement from a starting position to a final position along the workpiece formed by the shoe assembly. A motor, connected to the nozzle, is operable to effect the nozzle movement. The motor is initially caused to maintain the nozzle stationary in its starting position and is then operated to effect said nozzle movement. Extruding means effect extrusion of cement from the nozzle during the nozzle movement to apply cement along a surface of the workpiece.

It is desirable that the extruding means apply a substantially uniform quantity of cement along the surface of the workpiece during the nozzle movement. However, in th prior art machine the motor moves the nozzle from its starting position up to a desired speed along the workpiece so that the nozzle travels slower than this desired speed at the beginning of the nozzle movement, and, in the prior art machine the cement is extruded from the nozzle at a constant rate during the nozzle movement. Therefore, the quantity of cement applied by the nozzle to the workpiece at the beginning of the nozzle movement is greater than the quantity of cement applied by the nozzle to the workpiece during the remainder of the nozzle movement. It is the object of the [third] *second* aspect of the invention to overcome this deficiency and enable the nozzle to apply a substantially uniform quantity of cement along the surface of the workpiece during the entire movement of the nozzle along the surface of the workpiece. In order to accomplish this object, the prior art machine has been improved by providing first extrusion rate control means, effective at the beginning of the nozzle movement when the motor is moving the nozzle at a relatively slow speed, to cause the extruding means to extrude the cement from the nozzle at a relatively slow rate and by providing second extrusion rate control means, operable after the nozzle has moved a prescribed distance from its starting position that is less than the distance from its starting position to its final position at which time the motor is moving the nozzle at a relatively high speed, to cause the extruding means to extrude the cement from the nozzle at a relatively high rate.

DESCRIPTION OF THE PREFERRED EMBODIMENT

Figure 1:
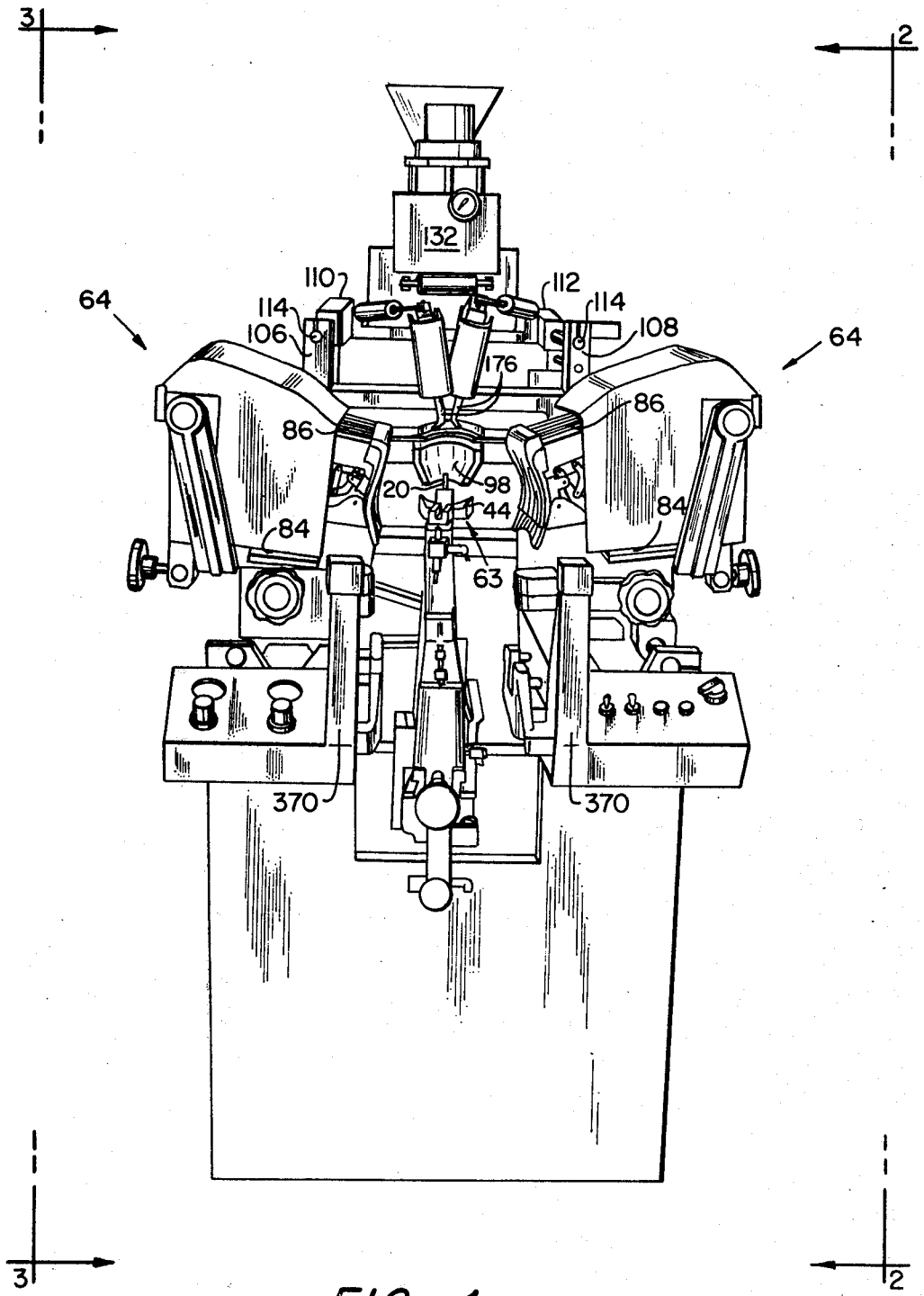
FIG. 1 is a front elevation of the machine.
Figure 2:
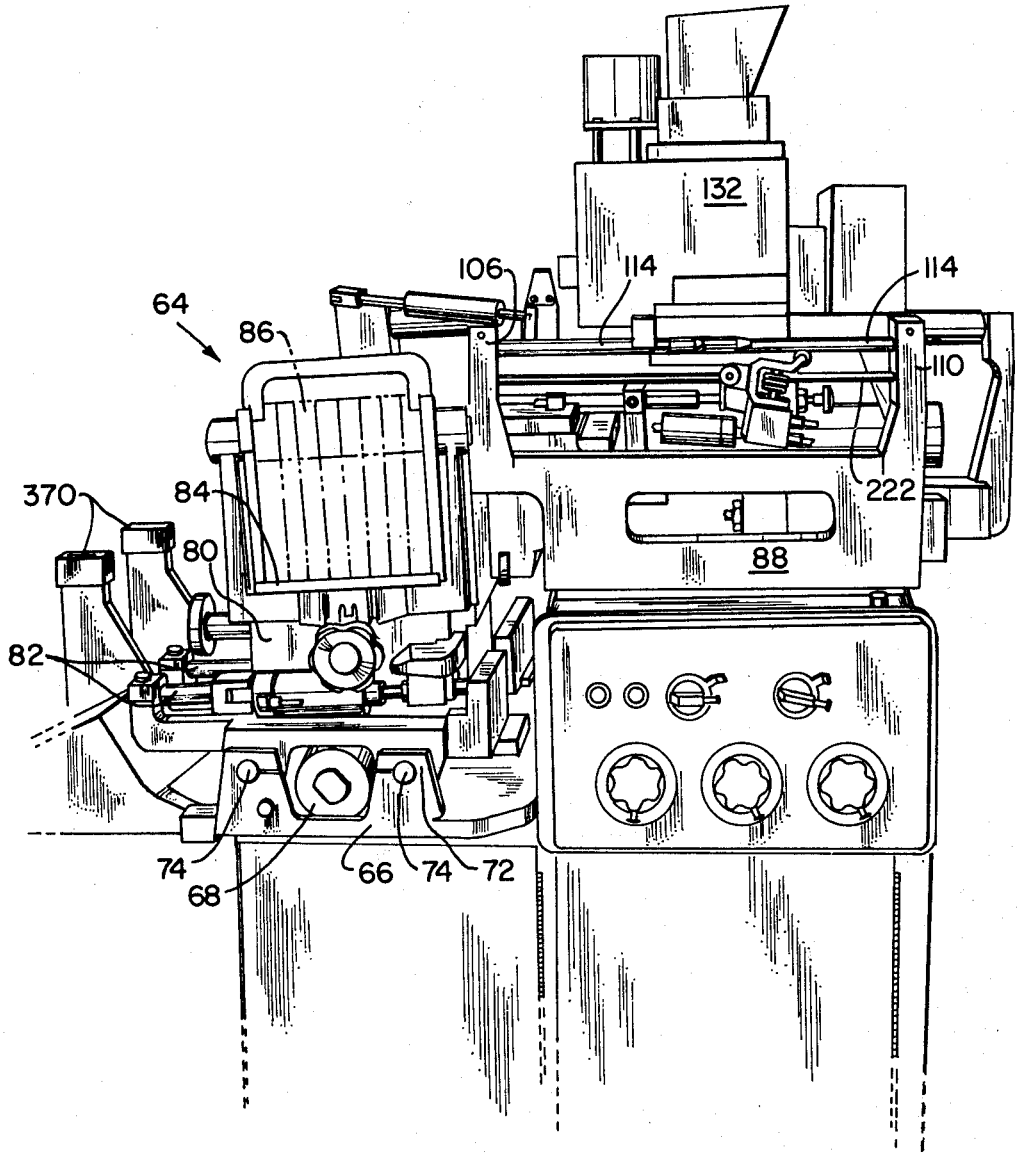
FIGS. 2 and 3 are side elevations of the machine respectively taken along the lines 2—2 and 3—3 of FIG. 1.
Figure 3:
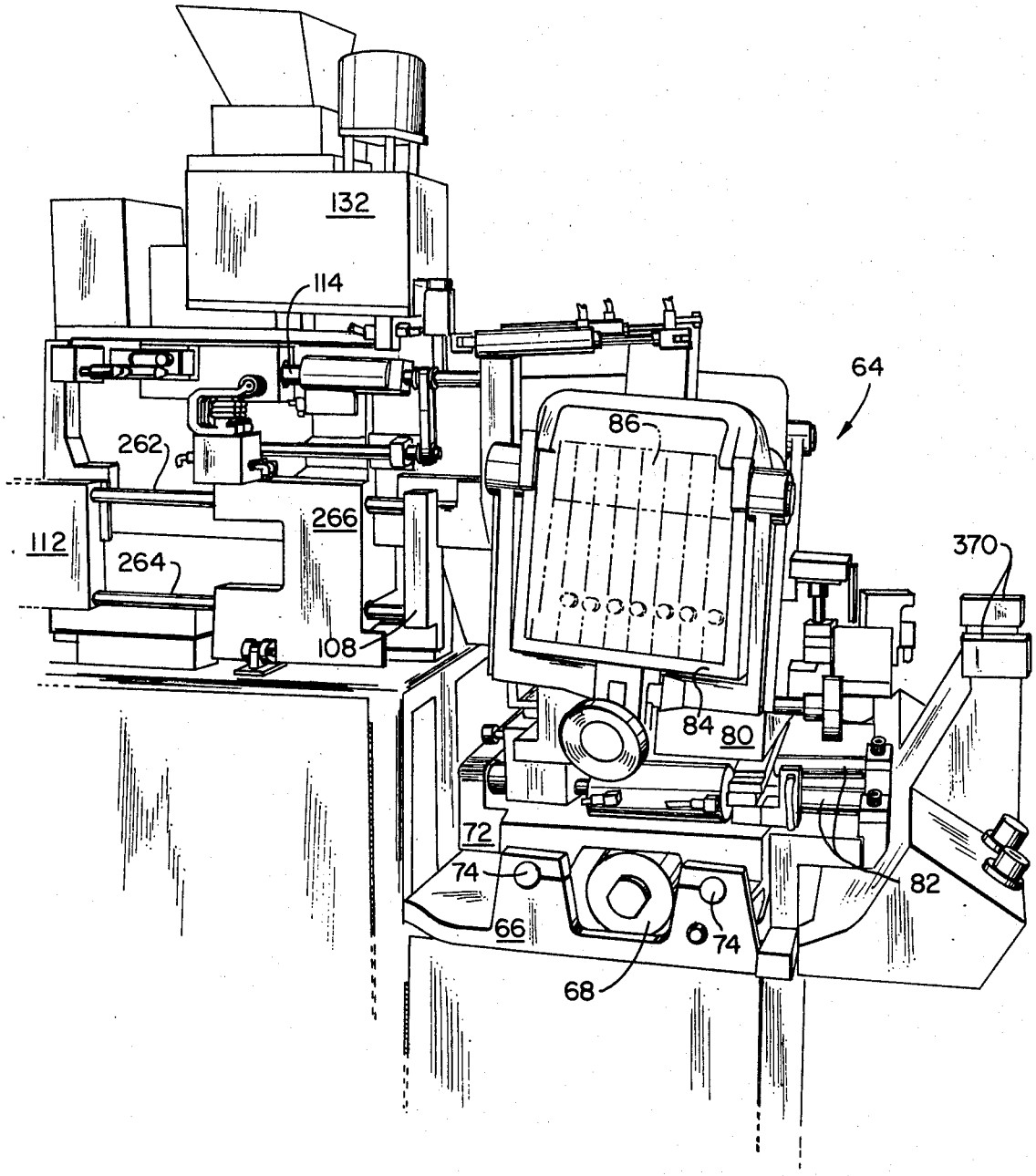

The operator is intended to stand in front of the machine as seen in FIG. 1, to the left of the machine as seen in FIG. 2, and to the right of the machine as seen in FIG. 3. Directions extending toward the operator will be designated as "forward" and directions extending away from the operator will be designated as "rearward". The front of the machine is closest to the operator and the back of the machine is furthermost from the operator.

Figure 4:
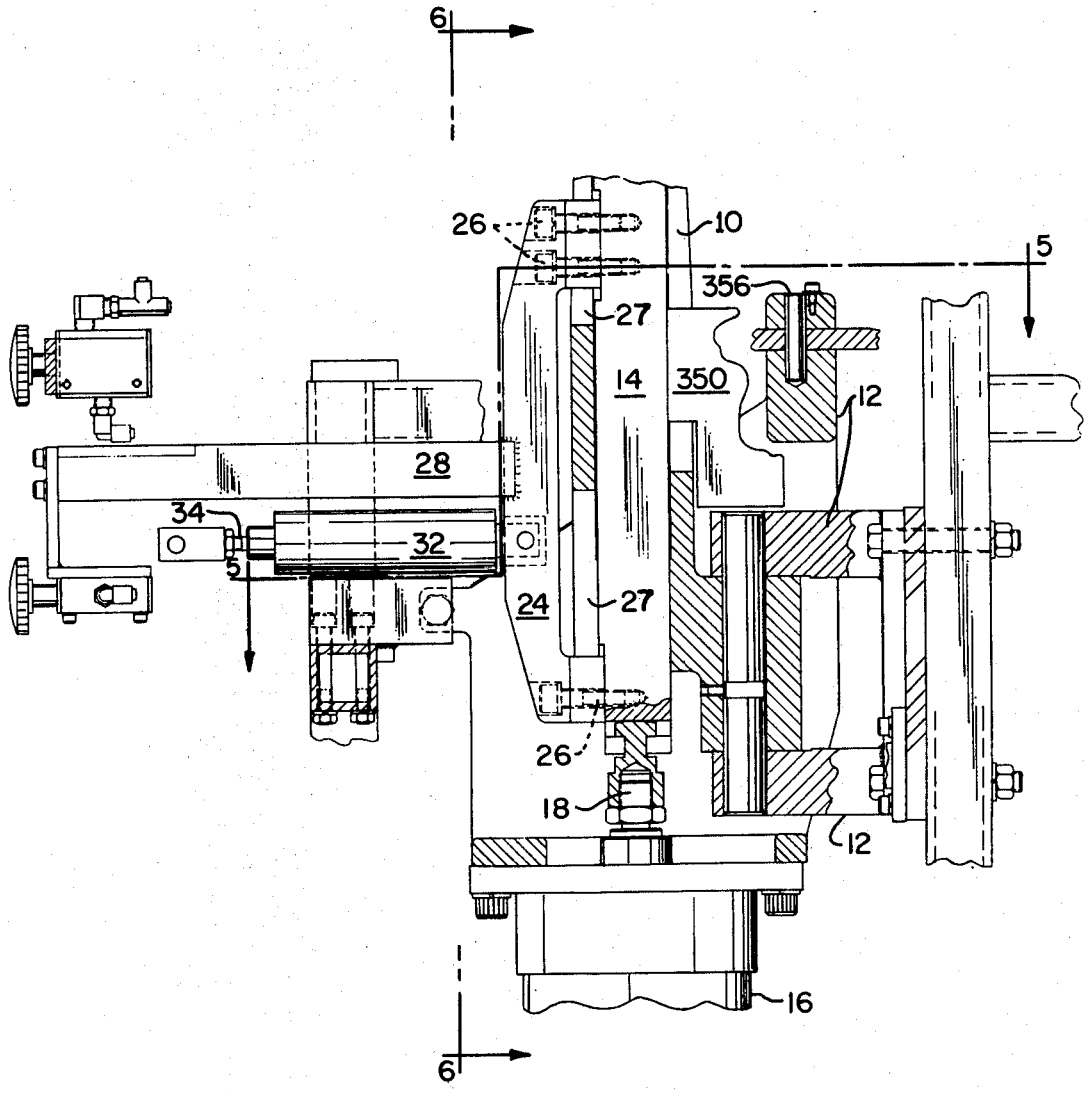
FIG. 4 is a partially sectional view of a mounting of the shoe assembly support.
Figure 5:
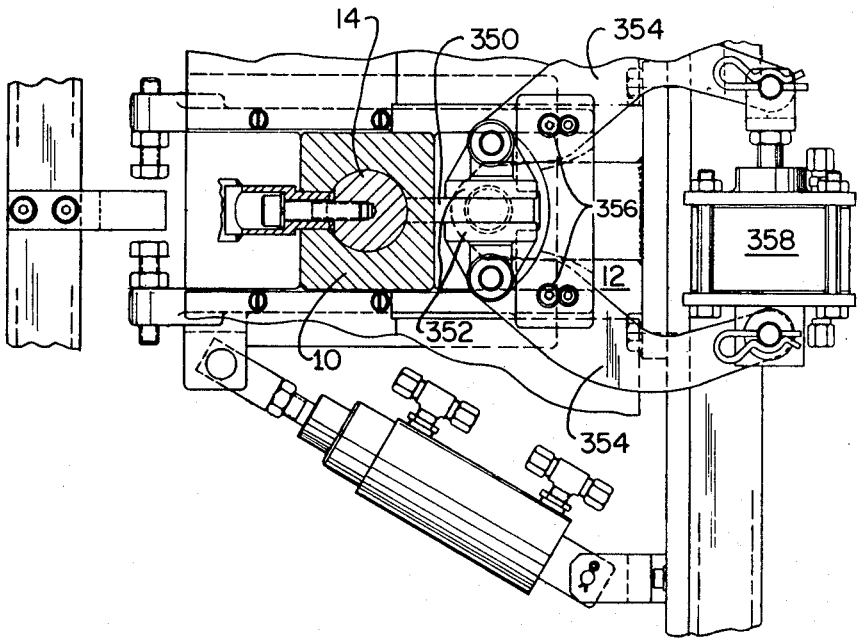
FIGS. 5 and 6 are views respectively taken along the lines 5—5 and 6—6 of FIG. 4.
Figure 6:
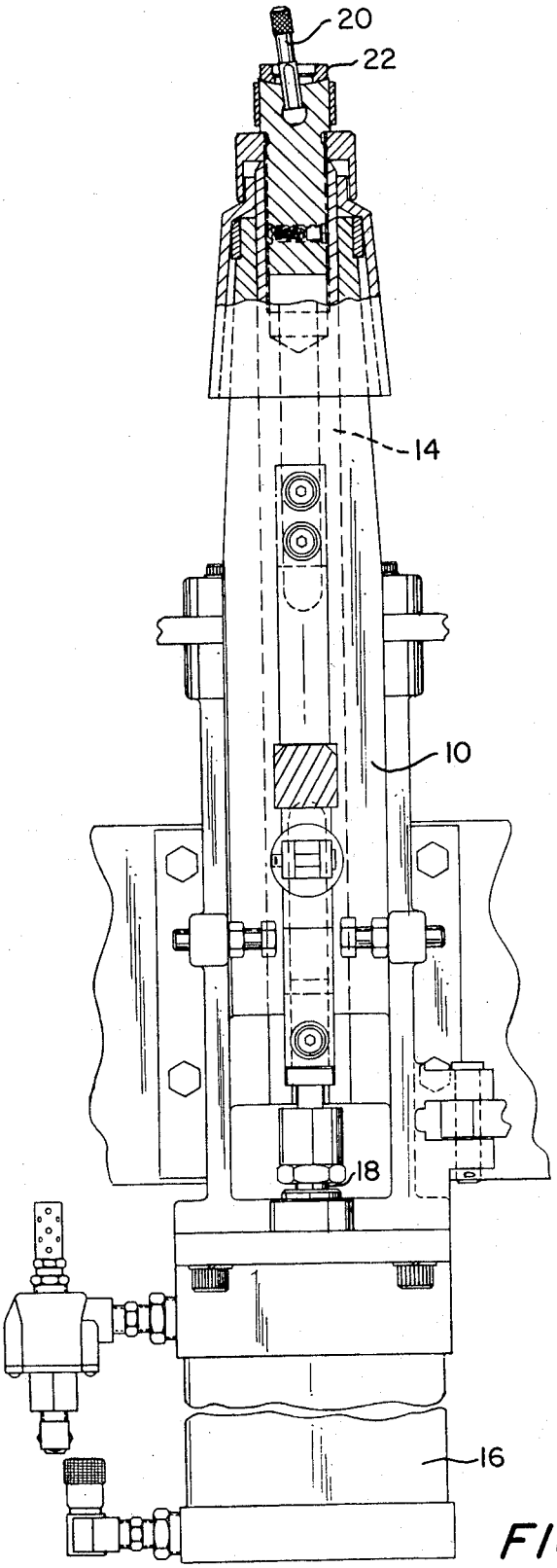

Referring to FIGS. 4–6, the machine includes a sleeve 10 that is mounted to a bracket 12. A bar 14 is mounted in the sleeve 10 for heightwise movement. An air operator motor 16, that is secured to the bracket 12, has an upwardly extending piston rod 18 that is secured to the bottom of the bar 14, whereby the motor 16 can effect heightwise movement of the bar 14. A last pin 20 and a support plate 22 are secured to the top of the bar 14. A flange 24 is affixed to the front of the bar 14 by means of screws 26 that connect the flange 24 and the bar 14 and that extend through slots 27 in the sleeve 10. A strut 28 is secured to and extends forwardly of the flange 24.

Figure 7:
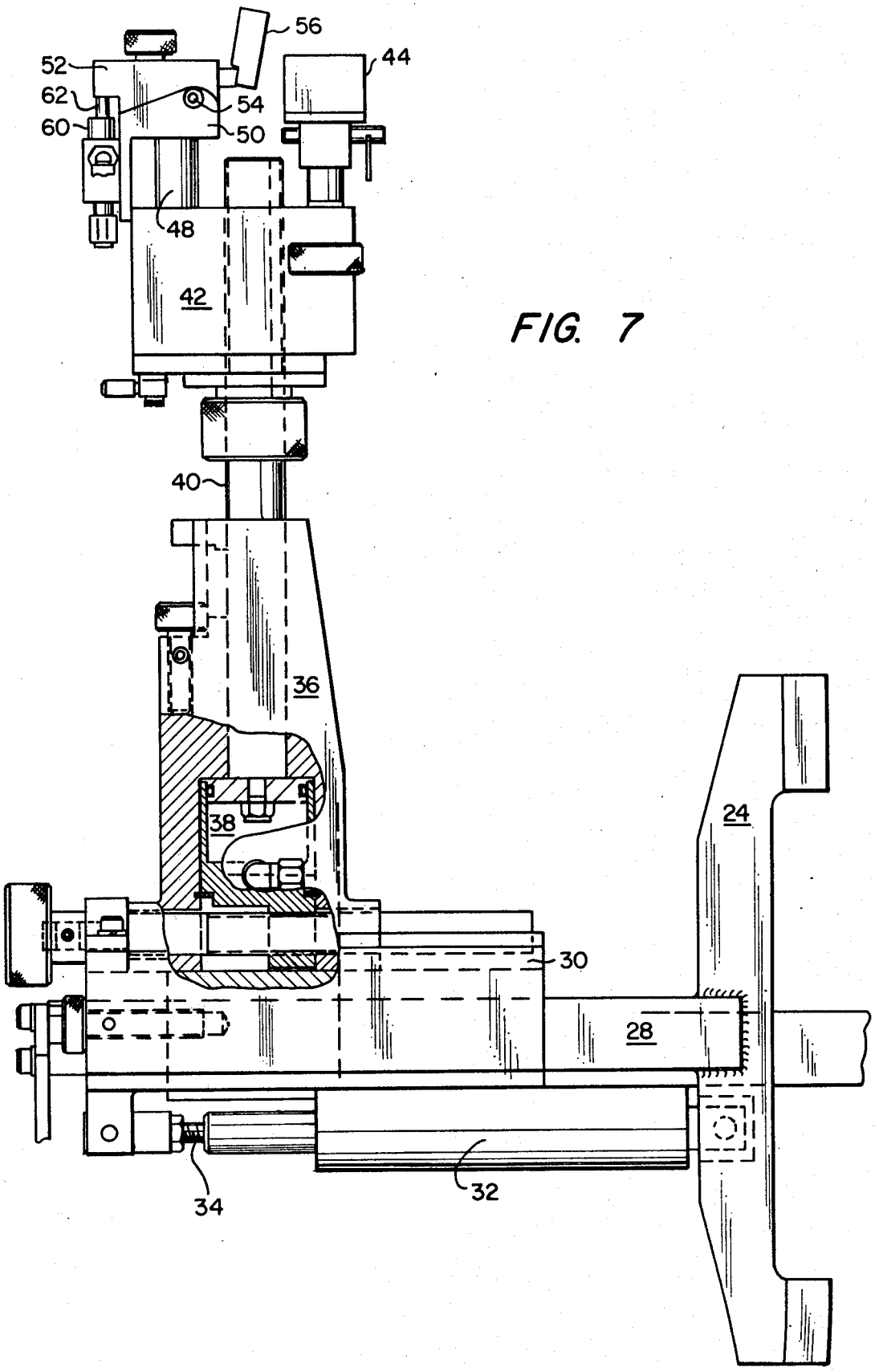
FIG. 7 is a partially sectional elevation of a toe rest-detector member assembly and the mounting therefor.
Figure 8:
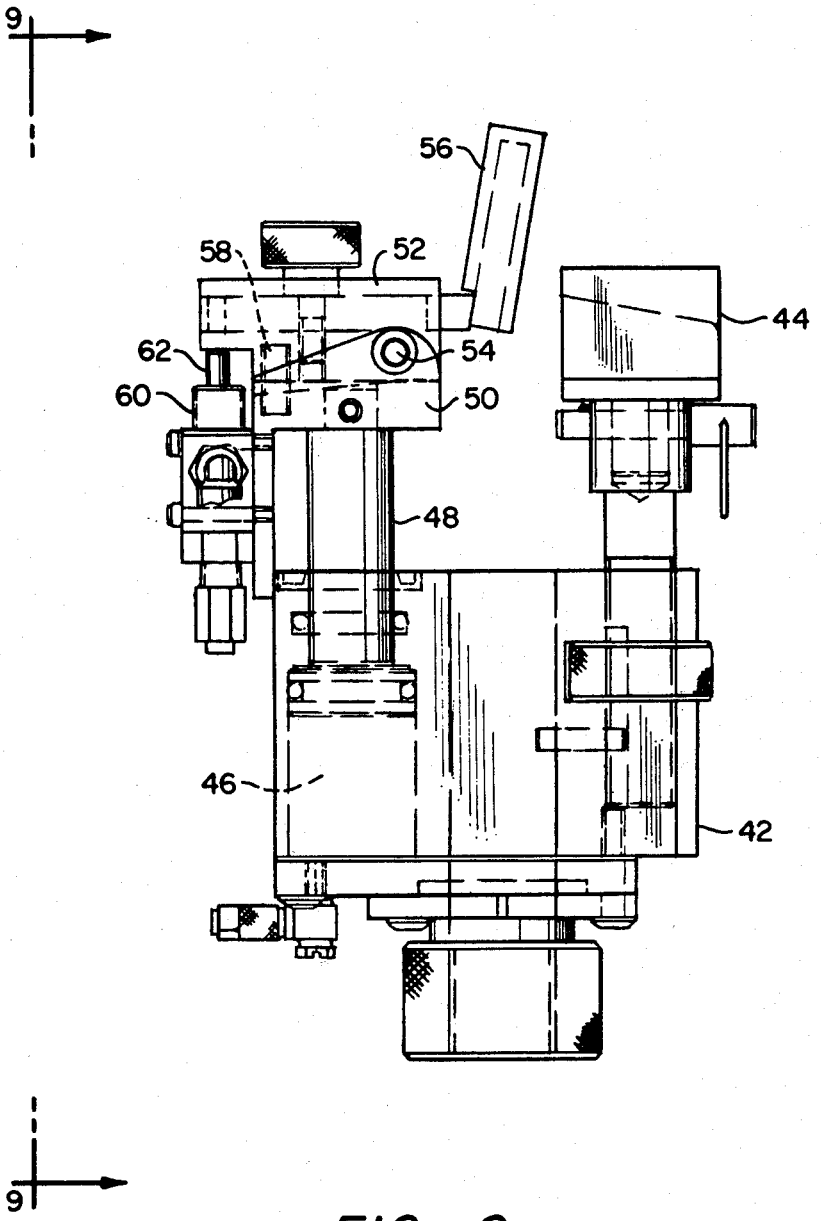
FIG. 8 is an elevation of the toe rest-detector member assembly.
Figure 9:
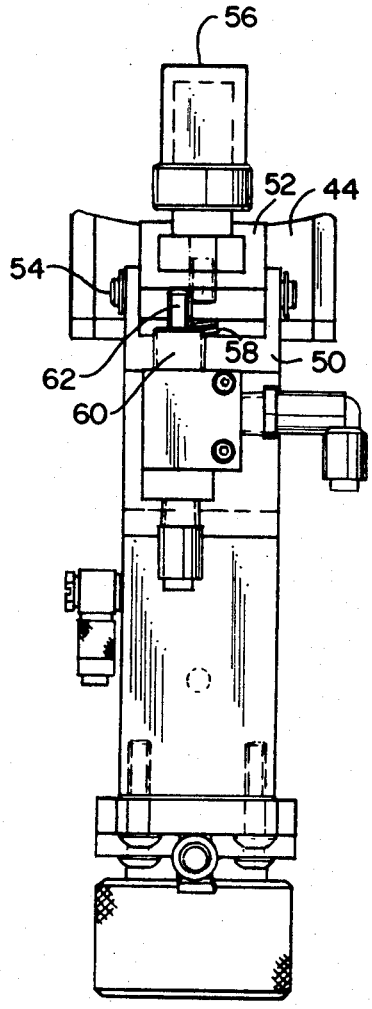
FIG. 9 is a view taken along the line 9—9 of FIG. 8.
Figure 10:
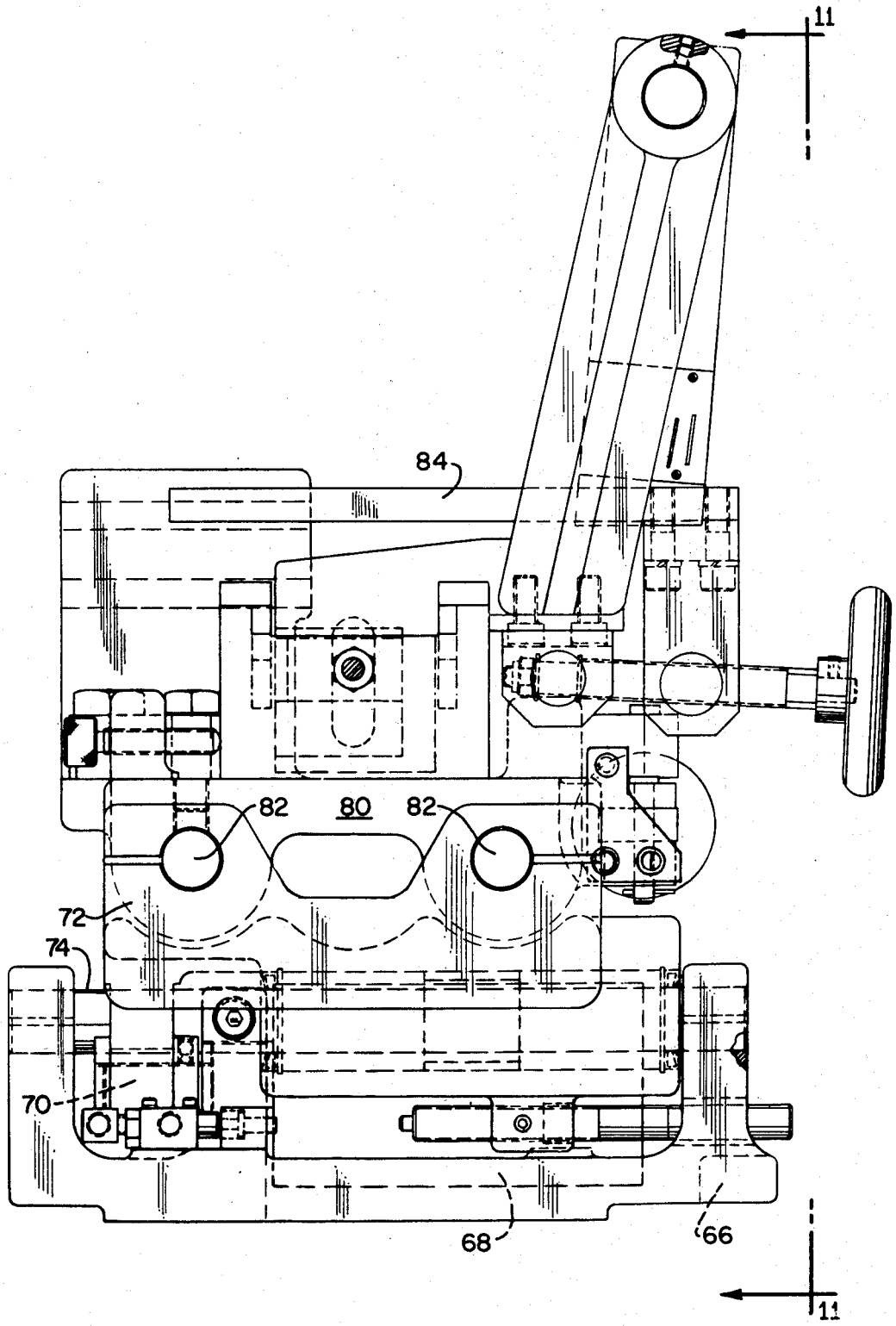
FIG. 10 is an elevation of a side lasting unit.
Figure 12:
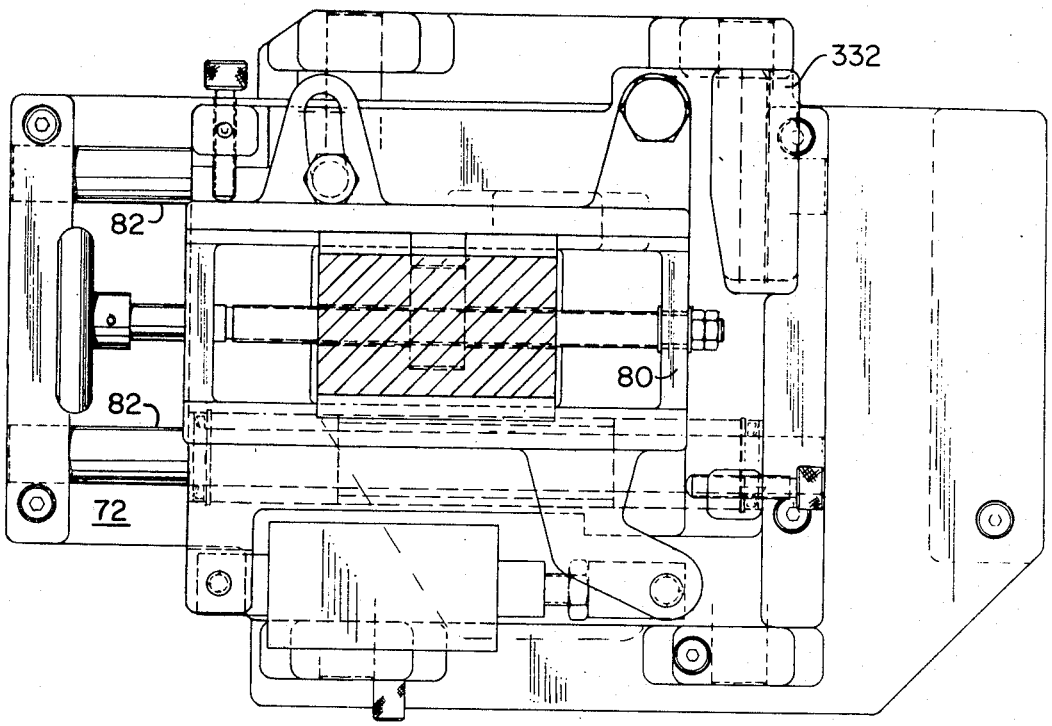
FIG. 12 is a view taken along the line 12—12 of FIG. 11.
Figure 11:
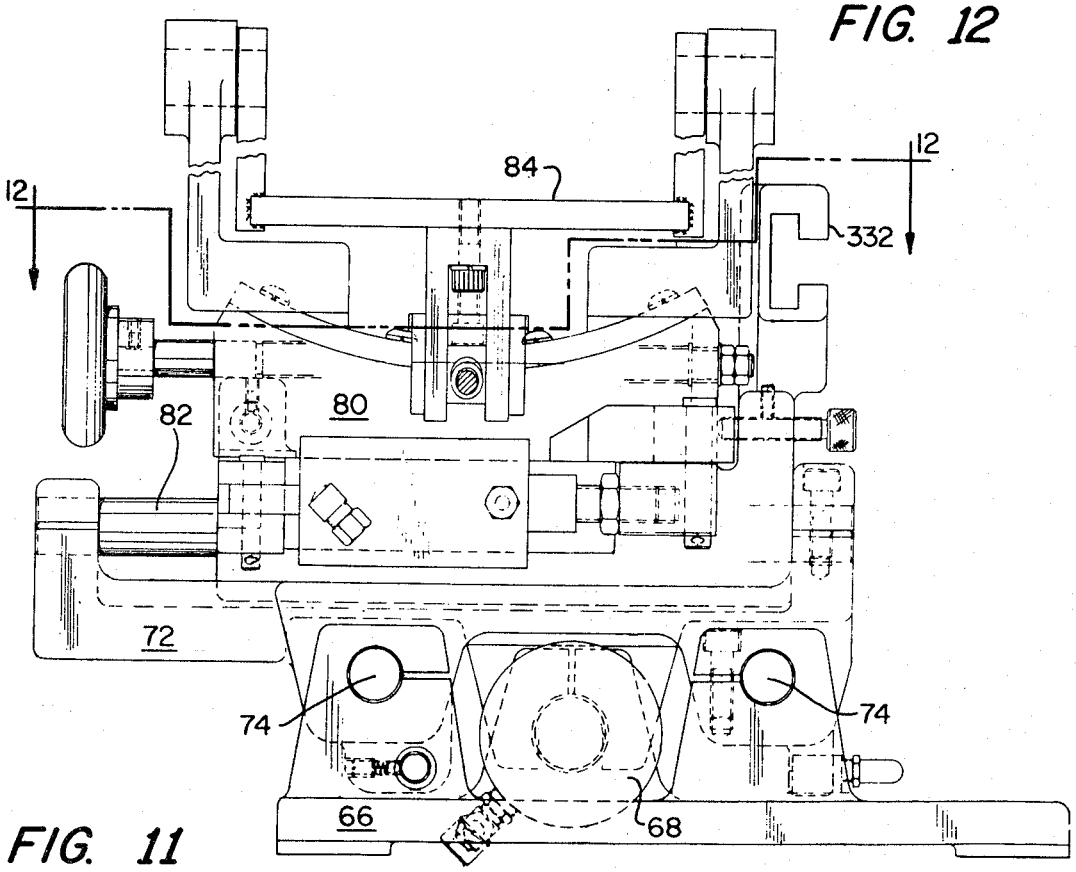
FIG. 11 is a view taken along the line 11—11 of FIG. 10.

Referring to FIGS. 7–9, a housing 30 is slideably mounted to the strut 28 for forward-rearward movement. An air operator motor 32, mounted to the flange 24, has a forwardly directed piston rod 34 that is connected to the housing 30. A column 36, extending upwardly of the housing 30, has an air operator motor 38 formed therein. The motor 38 has an upwardly directed piston rod 40 that is secured to a bracket 42. A toe rest 44 is secured to and extends upwardly of the bracket 42. An air [operator] *operated* motor 46, formed in the bracket 42, has an upwardly directed piston rod 48 and a clevis 50 is secured to the top of the piston rod 48. An arm 52 is pivoted to the clevis 50 by a pin 54 for swinging movement about the horizontal axis of the pin 54 in a vertical plane that lies at right angles to the transverse axis of the pin 54. A detector member or finger 56 is so mounted to the arm 52 as to extend upwardly of the back of the arm 52 forwardly of the toe rest 44. A compression spring 58, interposed between the fronts of the clevis 50 and the arm 52, yieldably urges the arm 52 clockwise (FIG. 8) about the axis of the pin 54 to thereby yieldably urge the finger 56 rearwardly about this axis to a position wherein the bottom of the back of the arm 52 abuts the clevis 50. A valve 60, mounted to the front of the bracket 42, has an upwardly directed valve spool 62 that is resiliently urged upwardly by a conventional spring in the valve 60 into engagement with the front of the arm 52.

The last pin 20, the support plate 22 and the toe rest 44 constitute a shoe assembly support 63 (FIG. 1).

Duplicate side lasting units 64 (FIGS. 1–3) are located on opposite sides of the shoe assembly support 63. Referring to FIGS. 2, 3 and 10–12, each side lasting unit 64 includes a table 66 that is mounted to the machine frame on opposite sides of the shoe assembly support 63. An air actuated motor 68, mounted to each table 66, has a piston rod 70 that is mounted to a frame 72. Each frame 72 is mounted to its associated table 66 for inward-outward movement by the frames 72 being slideably mounted on rods 74 that are secured to the tables 66. A sled 80 is mounted to each frame 72 for forward-rearward movement by the sleds 80 being slideably mounted on rods 82 that are secured to the frames 72.

In the manner shown in U.S. Pat. No. 3,962,741, a base 84 is adjustably mounted to each sled 80. A side lasting instrumentality 86 of the type shown in U.S. Pat. No. 3,962,741 is mounted to each base 84 (see FIG. 13).

Referring to FIGS. 2, 3 and 14–17, a head 88 is located rearwardly of the last pin 20 and the lasting units 64. A main slide plate 90 is slideably mounted in the head 88 for forward-rearward movement in the manner shown in U.S. Pat. No. 3,963,840. A fluid actuated motor 92, mounted to the head 88, has a piston rod 94 connected to a bracket 96 mounted to the main slide plate 90 to effect forward-rearward movement of the main slide plate 90. In the manner shown in U.S. Pat. No. 3,963,840, a forwardly facing heel clamp 98 and forwardly facing heel wipers 100 are movably mounted to the main slide plate 90 with the heel wipers 100 being located above the heel clamp 98. A hold-down 102 is movably mounted to a cover 104 of the main slide plate 90 for forward-rearward movement and for heightwise movement in the manner shown in U.S. Pat. No. 3,963,840.

Referring to FIGS. 1–3, 14 and 15, a pair of front posts 106 and 108 and a pair of back posts 110 and 112 are upstanding from the head 88. The two front posts and the two back posts are located on opposite sides of the head 88 and a slide rod 114 extends between the posts 106 and 110 and between the posts 108 and 112 so as to be located on opposite sides of the head 88 and so as to extend in forward-rearward directions. A bearing block 116 is slideably mounted on one of the rods 114 and a bearing block 118 is slideably mounted on the other of the rods 114. A plate 120 extends between the slide rods 114 and is secured to the bearing blocks 116, 118, the plate 120 thus being mounted for forward-rearward movement. A lug 122, that is upstanding from a bracket 124 secured to the head 88, has an air operated motor 126 pivoted thereto. The motor 126 has a forwardly directed piston rod 128 that is mounted to a prong 130 depending from the front of the plate 120, whereby the motor 126 effects forward-rearward movement of the plate 120 and the parts, described below, mounted thereto.

Figure 18:
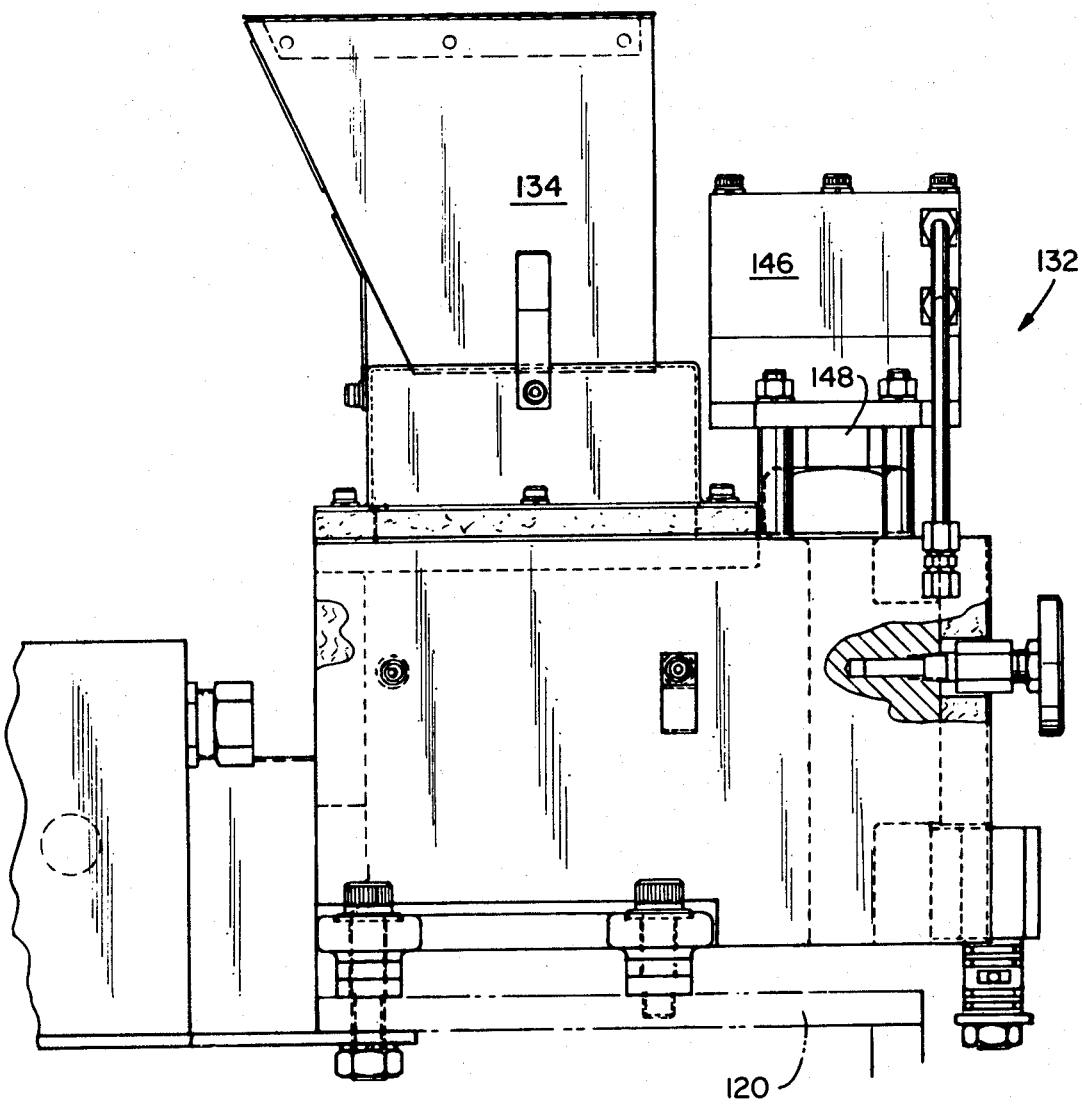
FIG. 18 is an elevation of a cement pumping mechanism.
Figure 19:
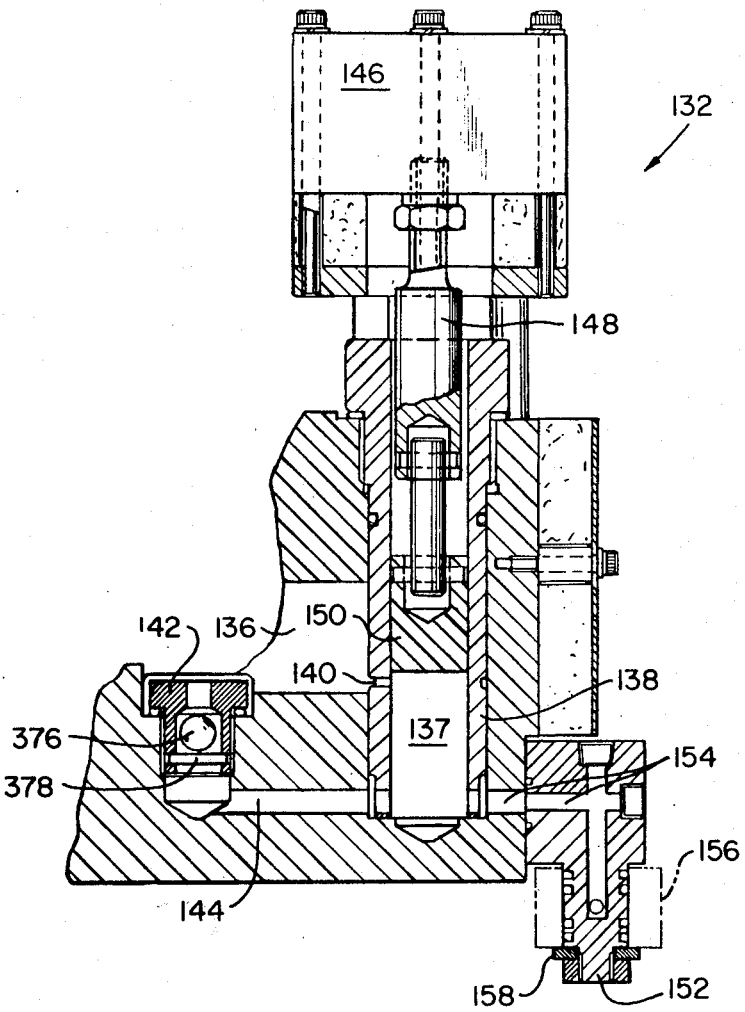
FIG. 19 is a section of part of the cement pumping mechanism.
Figure 20:
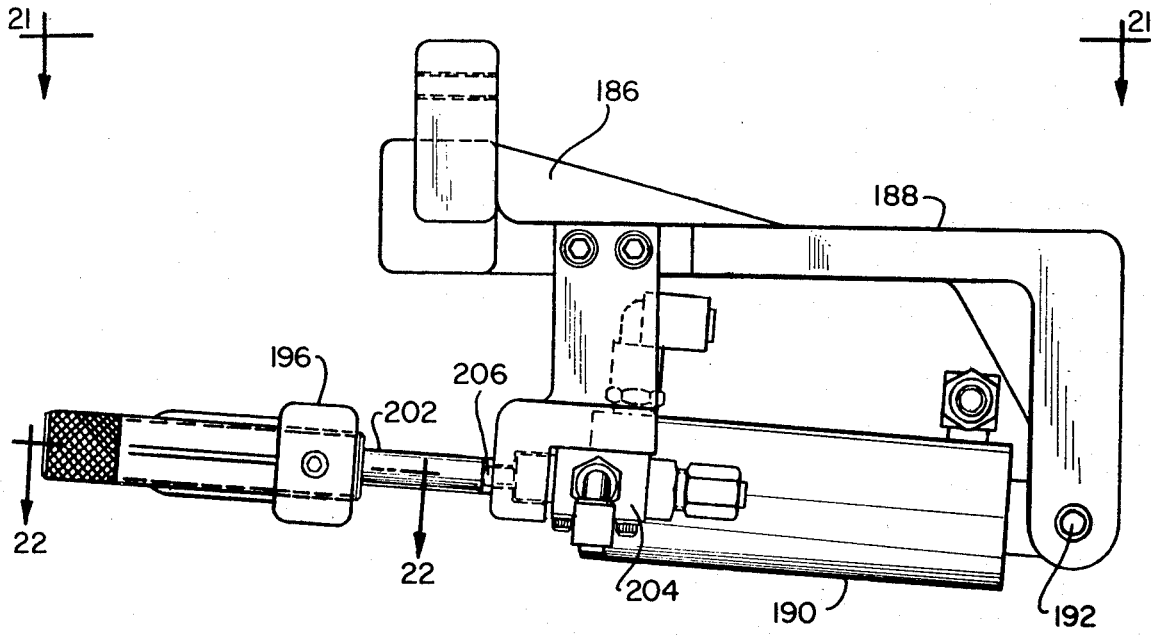
FIG. 20 is a side elevation of a nozzle raising and lowering mechanism.
Figure 22:
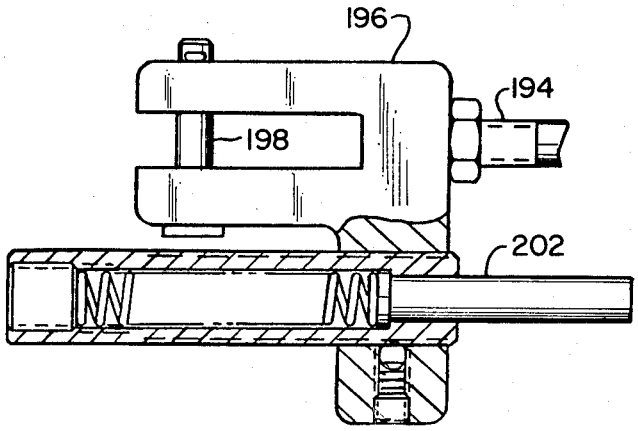
FIGS. 21 and 22 are respectively views taken along the lines 21—21 and 22—22 of FIG. 20.
Figure 21:
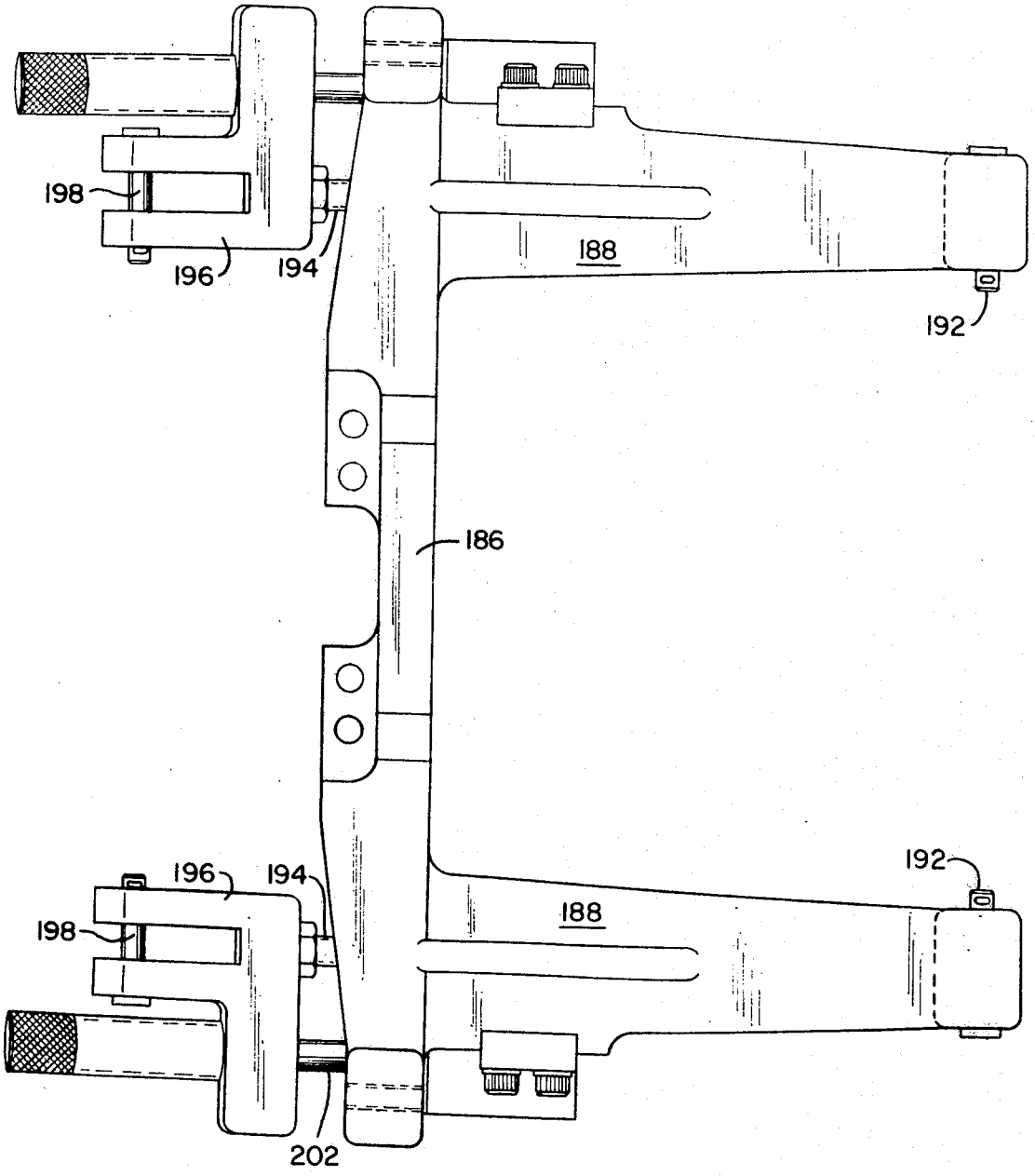

Referring to FIGS. 18 and 19, a cement pumping mechanism 132 is mounted to the slide plate 120 for forward-rearward movement therewith. The mechanism 132 includes a funnel 134 into which solid granules of thermoplastic cement is supplied and from which it gravitates into a storage chamber 136 wherein it is melted by heating means (not shown). The molten cement gravitates from the chamber 136 into a bore 137 formed by the interior of a hollow sleeve 138 by way of a passage 140 in the hollow sleeve 138 that provides communication between the chamber 136 and the bore 137 and by way of the interior of a valve 142 and a passage 144 that communicates with the bottom of the bore 137. An air actuated motor 146 has a downwardly directed piston rod 148 that is connected to a plunger 150, the plunger 150 being slideable in the bore 137. A post 152 is secured to and extends downwardly of the mechanism 132. Passages 154 provide communication between the opposite sides of the periphery of the post 152 and the bottom of the bore 137.

Figure 14:
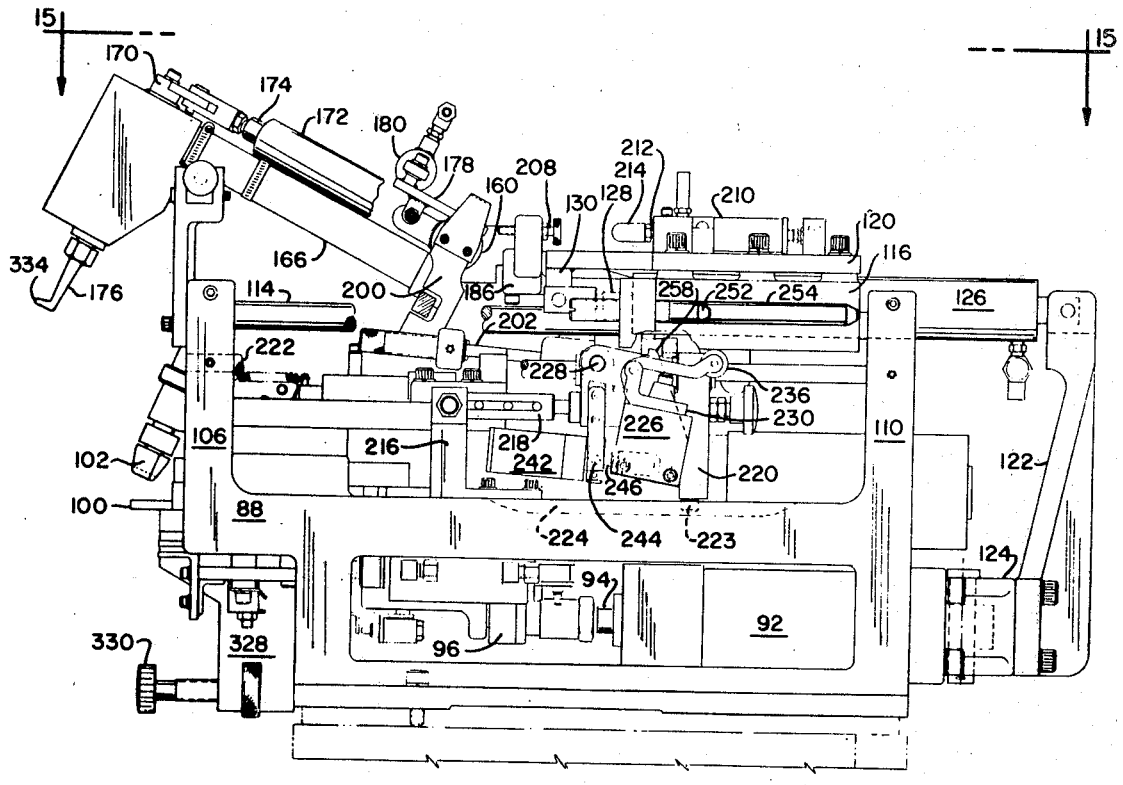
FIG. 14 is a side elevation of a portion of the machine showing instrumentalities operating on the heel portion of the shoe assembly and the cement applying nozzles.
Figure 15:
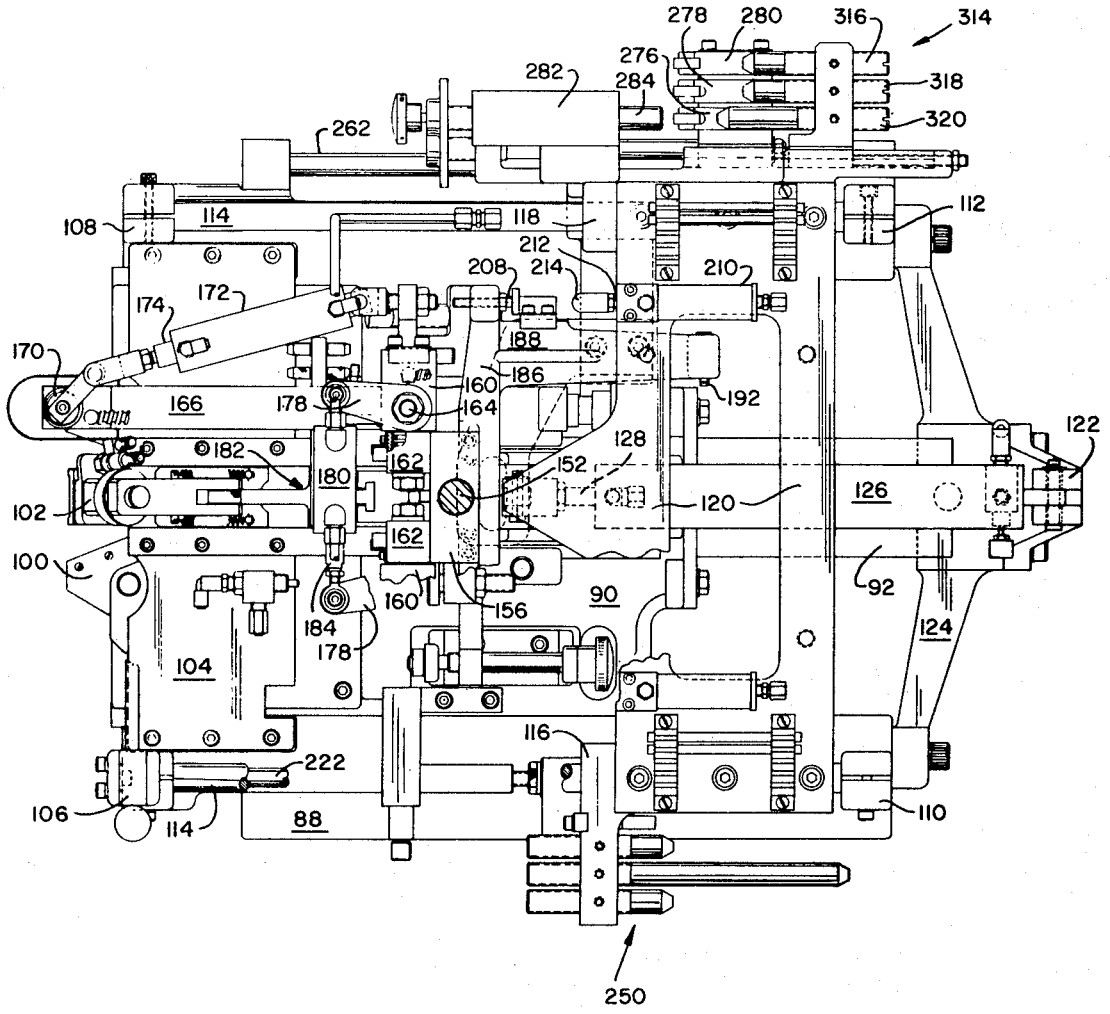
FIG. 15 is a view taken along the line 15—15 of FIG. 14.

Referring to FIGS. 14 and 15, the post 152 is seated in a block 156 that is swingably mounted on the post 152 and is held on the post 152 by a retaining ring 158 (FIG. 19).

Referring to FIGS. 14 and 15, a pair of spindles 160 are rotatably mounted in extensions 162 of the block 156 for swinging movement about a horizontal axis and a heightwise extending spindle 164 is swingably mounted in each spindle 160 for swinging movement about a heightwise extending axis in the manner shown in U.S. Pat. No. 3,963,840. A nozzle carrier 166 is mounted to each spindle 164 so as to extend forwardly thereof and a nozzle holder 170 is pivotally mounted to the front of each nozzle carrier 166 for swinging movement about a heightwise extending axis substantially as shown in U.S. Pat. No. 3,901,181. A motor 172, mounted to each spindle 160, has a forwardly directed piston rod 174 that is connected to each nozzle holder 170 to effect swinging movement of its associated nozzle holder 170. A nozzle 176 is mounted to and extends downwardly of each nozzle holder 170. Interconnected passages, not shown, in the members 156, 162, 160, 164, 166 and 170 provide communication between the passages 154 and the bottoms of the nozzles 176 substantially in the manner shown in U.S. Pat. Nos. 3,901,181 and 3,963,840. Strategically located electric heaters, not shown, serve to maintain the cement in these passages molten.

An arm 178 extends radially from each spindle 164. One of the arms 178 is connected to the cylinder 180 of an air operated motor 182 and the other arm 178 is connected to the piston rod 184 of the motor 182 whereby the motor 182 may effect rotation of the spindles 164 in the spindles 160 and thereby effect inward and outward movements of the nozzles 176.

Referring to FIGS. 14, 15 and 20–22, a frame 186 is attached to the block 156. Flanges 188 extend rearwardly of the frame 186 on each side of the frame 186 and an air operated motor 190 is pivoted to the back of each flange 188 by a pivot pin 192. The forwardly directed piston rod 194 of each motor 190 is secured to a clevis 196. Each clevis 196 is pivoted by a pin 198 to a lug 200 that is secured to and depends from one of the spindles 160. A rearwardly facing plunger 202 is secured to each clevis 196 and a valve 204 is secured to each flange 188. The stem 206 of each valve 204 is located rearwardly of and in registry with its associated plunger 202. The motors [109] *190* can thus be seen to effect swinging movement of the spindles 160 in the block extensions 162 and thereby effect heightwise movement of the nozzles 176. A stabilizer bolt 208 (FIGS. 14 and 15) is mounted to and extends rearwardly of each side of the frame 186. A spring return air operated motor 210, mounted to each side of the plate 120, has a forwardly directed piston rod 212 that is in registry with its associated stabilizer bolt 208. Each piston rod 212 has a head 214 mounted thereon that is adapted to engage its associated bolt 208 in the manner described below.

Figure 24:
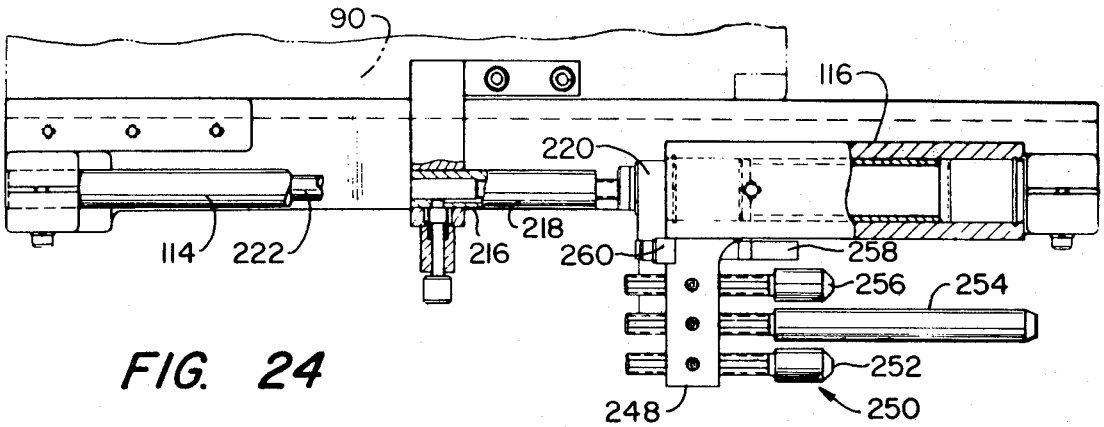
FIGS. 24 and 25 are respectively views taken along the lines 24—24 and 25—25 of FIG. 23.
Figure 23:
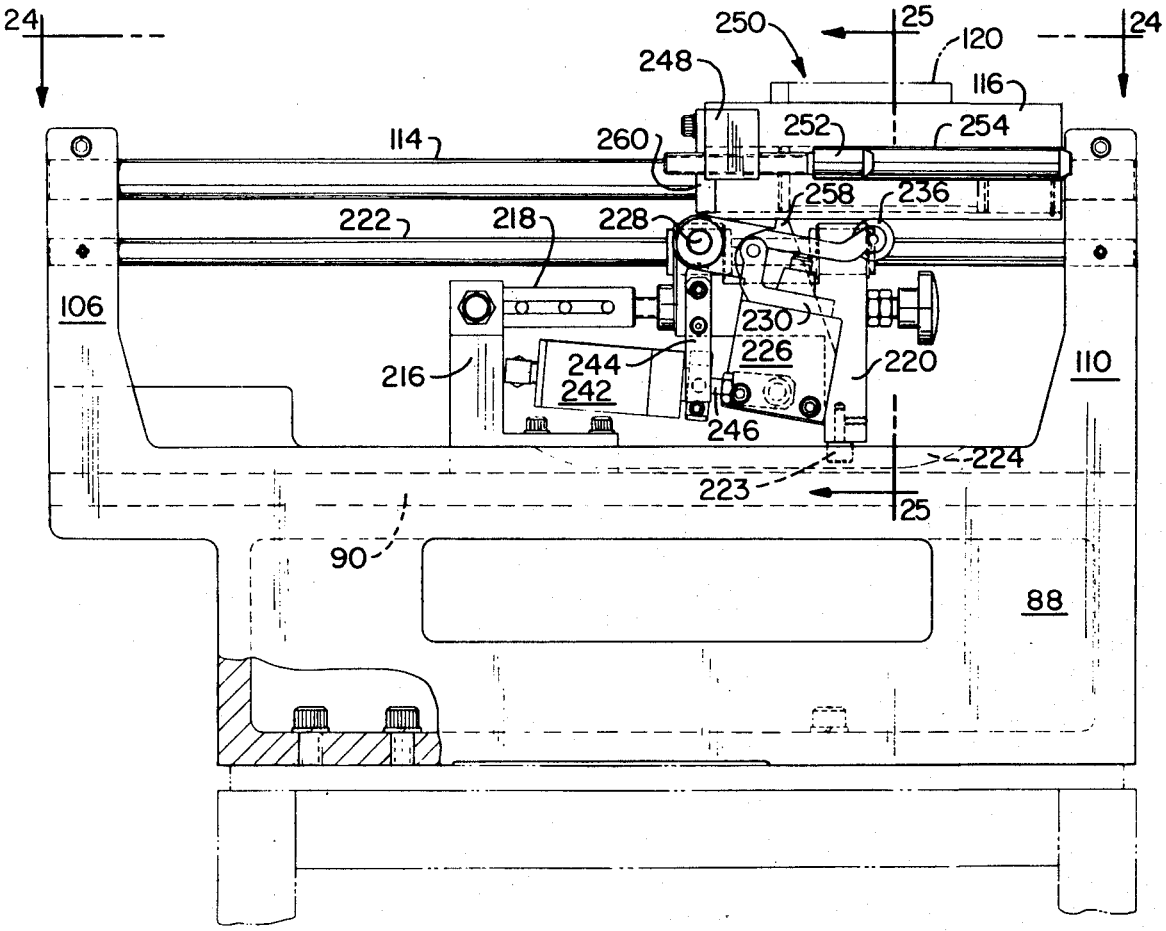
FIG. 23 is a side elevation of a portion of the machine that includes the extrusion rate control means.
Figure 25:
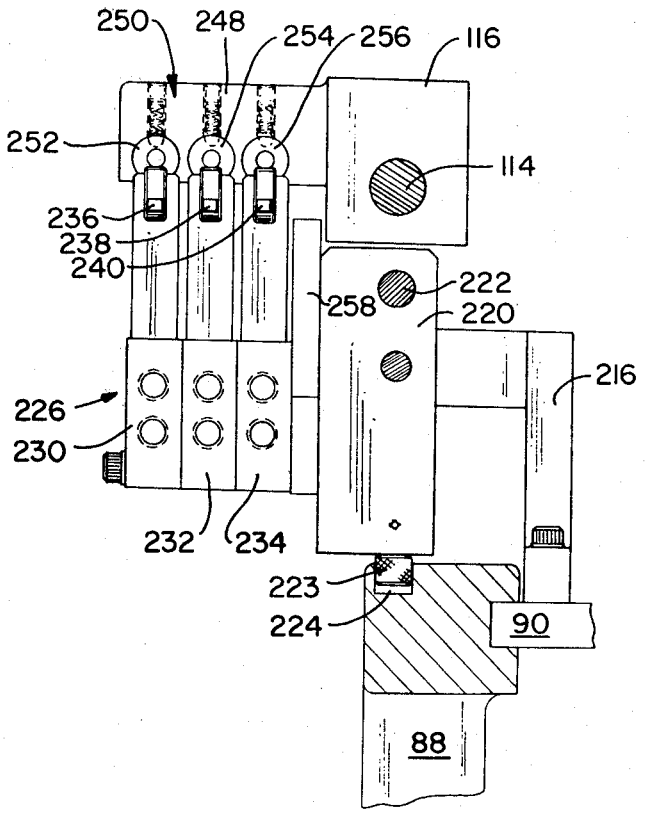

Referring to FIGS. 23–25, a brace 216 is anchored to the main slide plate 90 for forward-rearward movement therewith. A mount 218 is secured to the brace 216 and a housing 220 is secured to the mount 218. The housing 220 is slideably mounted on a rod 222 that extends between the posts 106 and 110 and the bottom of the housing 220 has a roll 223 fixed thereto that is slideably received in a cut out 224 in the head 88, thus enabling the housing 220 to partake of the forward-rearward movement of the main slide plate 90.

A valve bank 226 is pivotally mounted to the housing 220 for heightwise swinging movement about a pivot pin 228. The valve bank 226 includes three side by side valves 230, 232 and 234 which respectively have upwardly extending valve actuators 236, 238 and 240. An air actuated motor 242, mounted to a hanger 244 of the housing 220, has a piston rod 246 that is connected to the valve bank 226 thus enabling the motor 242 to effect heightwise movement of the valve bank 226. A strut 248 connected to the bearing block 116 mounts a cam bank 250. The cam bank 250 consists of three side by side rearwardly directed cams 252, 254 and 256 that are respectively in registry with the valve actuators 236, 238 and 240 when the valve bank has been raised by the motor 242 to an upper position. The cam 254 extends further rearwardly than the cams 252 and 256. A latch 258 is mounted to the valve bank 226 for heightwise movement therewith and, when raised to an upper position by the motor 242, is in intersecting relation with a detent 260 that is mounted to the strut 248.

Figure 26:
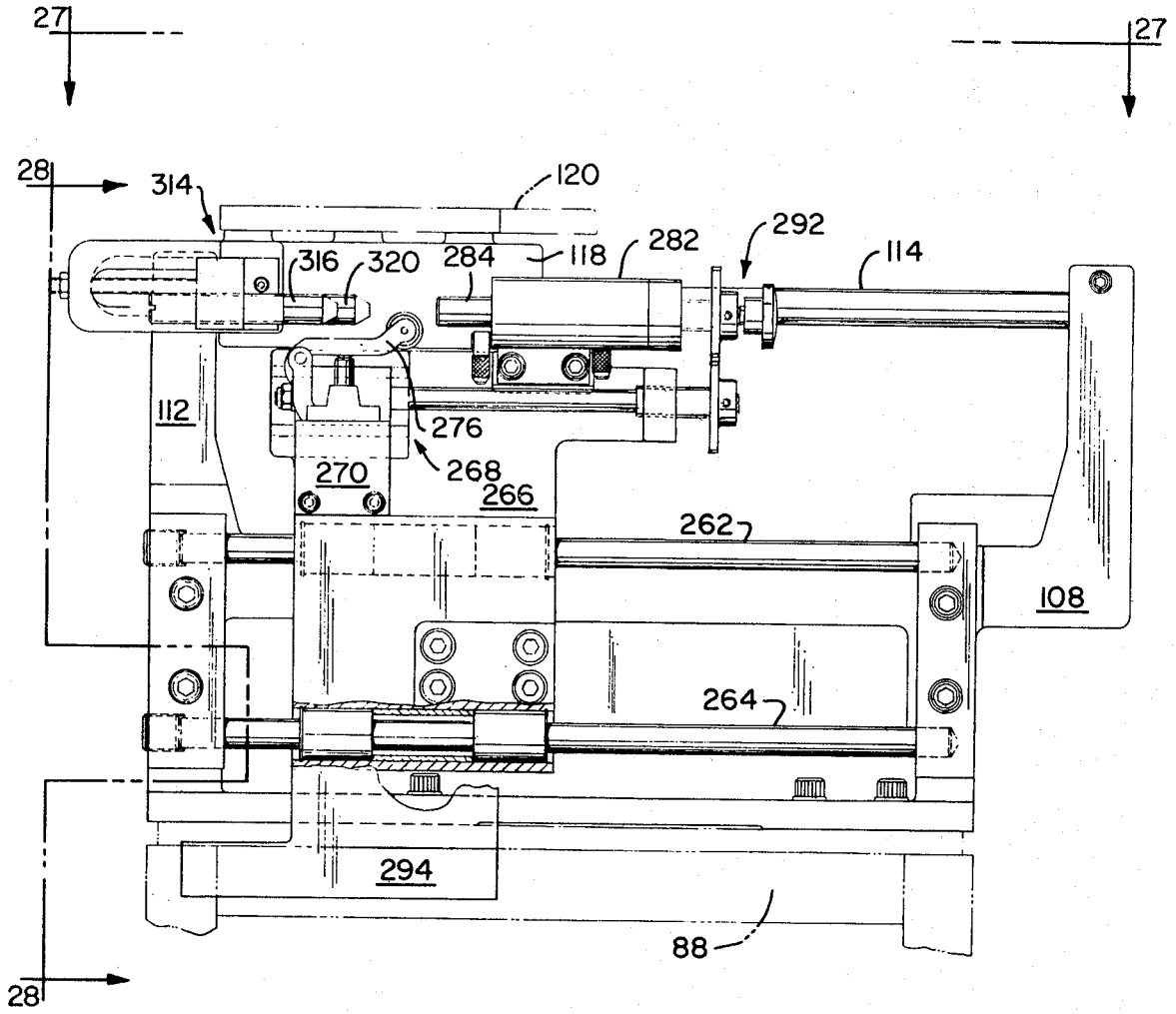
FIG. 26 is a side elevation of a portion of the machine that includes the stop member and the mounting therefor.
Figure 27:
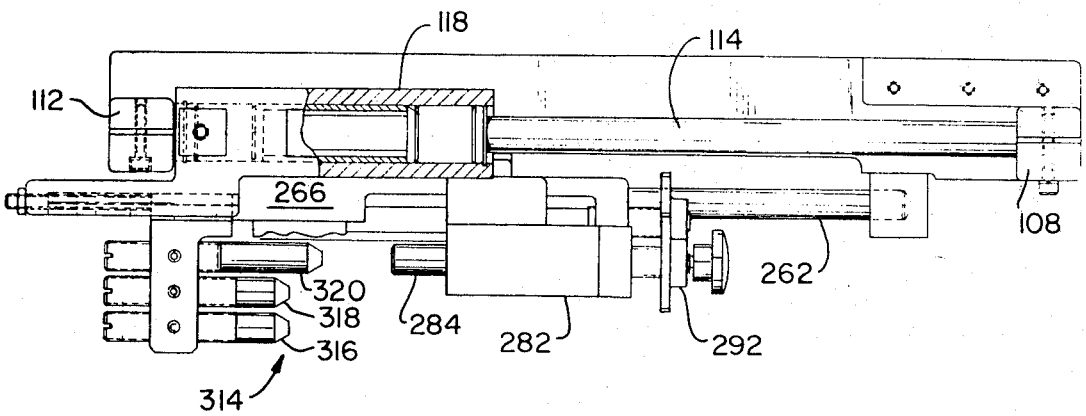
FIGS. 27 and 28 are respectively views taken along the lines 27—27 and 28—28 of FIG. 26.
Figure 28:
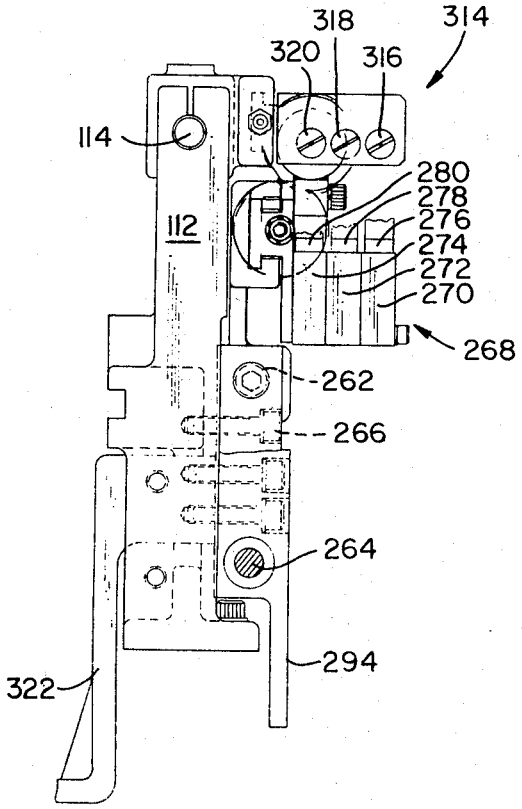

Referring to FIGS. 26–28, a pair of vertically spaced rods 262 and 264 are so mounted to the head 88 as to be below and outwardly offset from the rod 114 extending between the posts 108 and 112. A housing 266 is slideably mounted on the rods 262, 264 for forward-rearward movement. A valve bank 268, containing three side by side valves 270, 272 and 274, is mounted to the housing 266 for forward-rearward adjustment. The valves 270, 272 and 274 respectively have upwardly extending valve actuators 276, 278 and 280. An air actuated motor 282 is so mounted to the housing 266 as to have piston rod 284 directed rearwardly with the piston rod location forwardly of and in alignment with the valve actuator 276. A stop pin 286 (see FIG. 30) is mounted to the motor 282 for forward-rearward adjustment and is located within the cylinder 288 of the motor 282 forwardly of the piston 290 of the motor 282. An adjusting mechanism 292 so connects the stop pin 286 and the valve bank 268 as to enable them to be adjusted forwardly and rearwardly in unison. A tail 294 depends from the housing 266.

Figure 29:
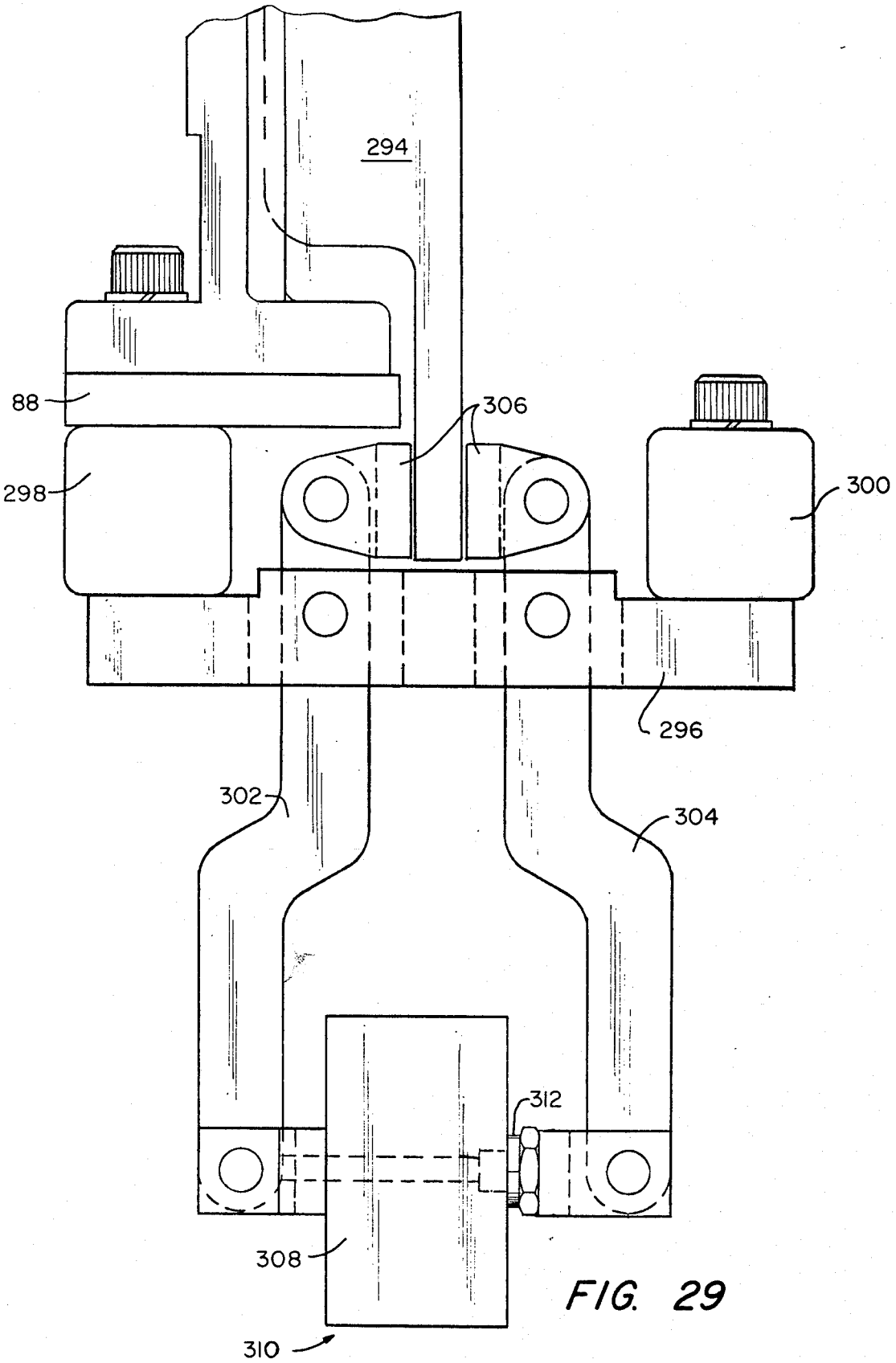
FIG. 29 is a view of a braking mechanism that is cooperative with the stop member to lock it, together with the detector member, in a forward-rearward position.

As shown in FIG. 29, a bracket 296 extends between elements 298 and 300 of the head 88. A pair of arms 302 and 304 are pivotally mounted to the bracket 296 and a brake pad 306 is pivoted to the top of each of these arm with the brake pads being located on opposite sides of the tail 294. The bottom of the arm 302 is pivoted to the cylinder 308 of an air operated motor 310 and the bottom of the arm 304 is pivoted to the piston rod 312 of this motor. The motor 310 is therefore actuable to move the brake pads 306 towards and away from the tail 294.

Referring again to FIGS. 26–28, a cam bank 314 is mounted to the bearing block 118 for forward-rearward movement therewith. The cam bank 314 includes cams 316, 318, and 320 that are respectively in alignment with the valve actuators 270, 272 and 274, the cam 320 also being in alignment with the piston rod 284. The cam 320 extends further forwardly than the cams 316 and 318.

Figure 31:
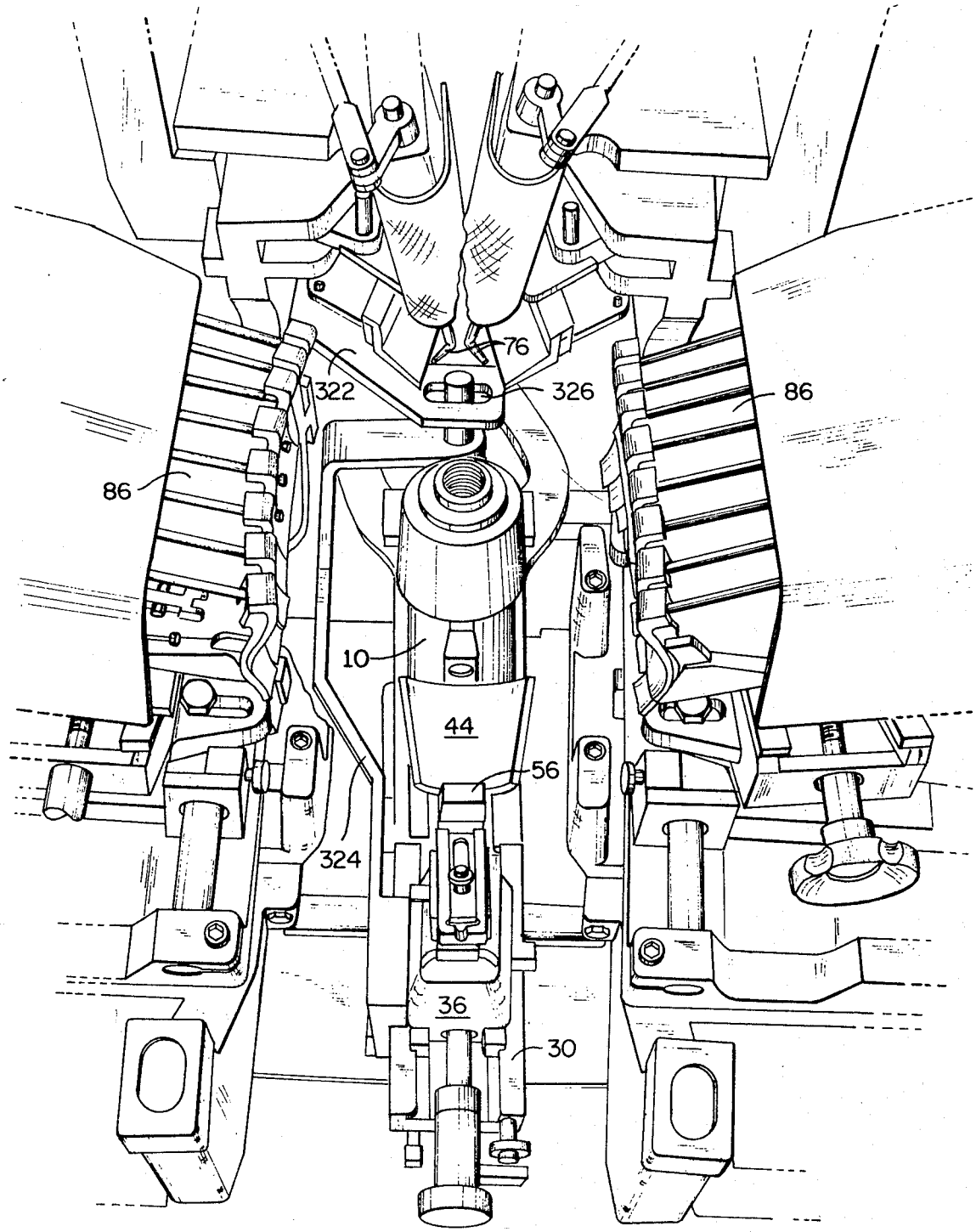
FIG. 31 is an isometric view showing linkage connecting the stop member and the detector member.
Figure 32:
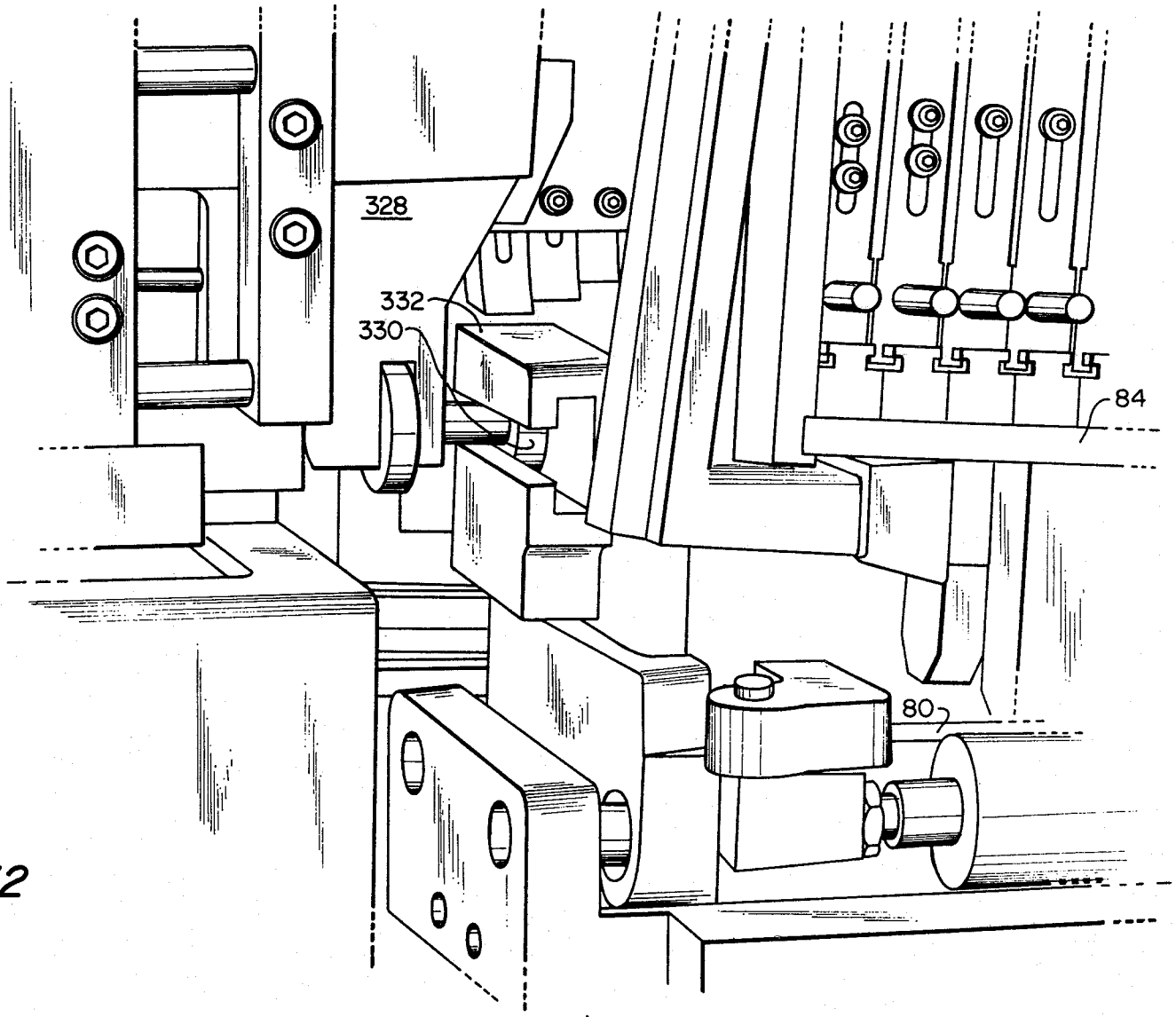
FIG. 32 is an isometric view of the connection of the side wiping means to the slide plate.

Referring to FIGS. 28 and 31, a link 322 is secured to the housing 266 and depends from and extends forwardly of this housing. A link 324 is secured to and extends rearwardly of the housing 30. A pin and slot connection 326 connects the links 322, 324 for unitary forward-rearward movement whereby the motor 32 effects concurrent forward-rearward movement of the housings 30 and 266.

Referring to FIGS. 11, 12, 16 and 32, a lug 328 depends from each side of the front of the main slide plate 90 and a rod 330 is adjustably mounted to each lug 328 for forward-rearward adjustment. Each rod 330 is captured in a gib 332 that is secured to each sled 80, the gibs 332 being so constructed as to enable the main slide plate 90 and the sleds 80 to move forwardly and rearwardly in unison while permitting the sleds 80 to have inward-outward movement with respect to the main slide plate 90.

Figure 30:
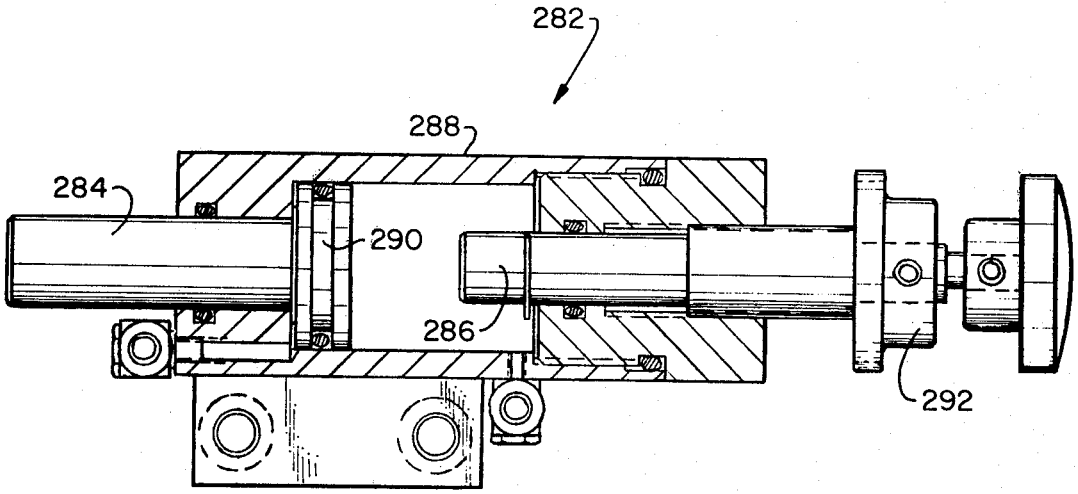
FIG. 30 is a section of the stop member.

In the idle condition of the machine: the piston rod 18 is retracted into the motor 16 to maintain the shoe assembly support 63 is a lower position; the piston rod 34 is projected out of the motor 32 to maintain the toe rest 44, the finger 56, the valve bank 268 and the motor 282 in forward positions; the motor 38 causes the piston rod 40 to move upwardly to thereby resiliently urge the toe rest 44 upwardly under the force of pressurized air in the motor 38; the piston rod 48 is projected out of the motor 46 to maintain the finger 56 in an upper position with respect to the toe rest 44 with the finger extending upwardly of the toe rest; the piston rods 70 are retracted into the motors 68 to thus maintain the bases 84 in outer positions and thus position the side lasting instrumentalities 86 in outer positions wherein they do not interfere with the placement of a shoe assembly on the shoe assembly support 63 as described below; the piston rod 94 is retracted into the motor 92 to maintain the main slide plate 90 and the heel clamp 98 and the heel wipers 100 carried by the main slide plate 90 in rearward positions, the motor 92 also, through the connection provided by the members 328, 330 and 332 thus maintaining the sleds 80, together with the side lasting instrumentalities 86, in rearward positions on the rods 82; the piston rod 128 is retracted into the motor 126 to thereby locate the plate 120 and the parts carried thereby, including the nozzles 176, in a rearward position with the detent 260 located rearwardly of the valve bank 226 and the latch 258; the piston rod 148 is retracted into the motor 146 so that the bottom of the plunger 150 is above the passage 140; the piston rods 174 are projected out of the motors 172 so that tips 334 (FIG. 14) at the bottoms of the nozzles 176 point outwardly substantially at right angles to the longitudinal center line of the machine; the piston rod 184 is retracted into the cylinder 180 of the motor 182 so that the nozzles 176 are swung about the axes of the spindles 164 to positions that are relatively close to each other; the piston rods 194 are projected out of the motors 190 to thereby move the nozzles 176 about the axis of the spindles [168] *160* to raised positions; the piston rods 212 are projecting out of the motors 210 with the heads 214 bearing against the stabilizer bolts 208 so that the block 156, together with the nozzles 176, [a] *is* restrained against movement about the upright axis of the post 152; the piston rod 246 is retracted into the motor 242 to thereby lower the latch 250 out of intersecting relationship with the detent 260 and to lower the valve bank 226 out of intersecting relationship with the cam bank 250; the piston rod 284 is projected to its greatest extent rearwardly of the motor 282, as shown in FIG. 30, so that the piston 290 is spaced from the stop pin 286, the cam bank 314 at this time being rearward of the valve bank 268; and the piston rod 312 is retracted into the cylinder 308 of the motor 310 so that the brake pads 306 are spaced from and not in engagement with the tail 294.

Thermoplastic cement is deposited in the funnel 134 of the pumping mechanism 132 and gravitates into the storage chamber 136 wherein it is melted. The molten cement flows from the chamber 136 through the passage 140 and through the interior of the valve 142 and the passage 144 into the bottom of the bore 137. From the bottom of the bore 137, the molten cement flows through the passages 154 and the above mentioned interconnected passages in the members 156, 162, 160, 164, 166 and 170 up to valves in each nozzle holder 170 that are similar to the valves in the nozzle holders shown in U.S. Pat. No. 3,901,181.

A shoe assembly 336 (FIGS. 33 and 33A) comprising a last 338 having an insole 340 located on its bottom and an upper 342 mounted thereon is placed bottom-up on the shoe assembly support 63 with the vamp of the shoe assembly resting on the toe rest 44, with the back cone 344 of the last resting on the support plate 22 and with the last pin 20 inserted into the thimble 346 in the heel portion of the last so that the toe of the shoe assembly faces forwardly. At this time the detector finger 56 is located forwardly of the toe end extremity of the shoe assembly 336 an amount that is dependent on the length of the shoe assembly 336 and that is also dependent on the distance between the thimble 346 and the toe end extremity of the shoe assembly. Prior to placement in the machine, the shoe assembly 336 had been toe lasted so that the toe portion 347 (see FIG. 34) of the upper margin had been wiped against and attached to the insole 340.

Figure 33:
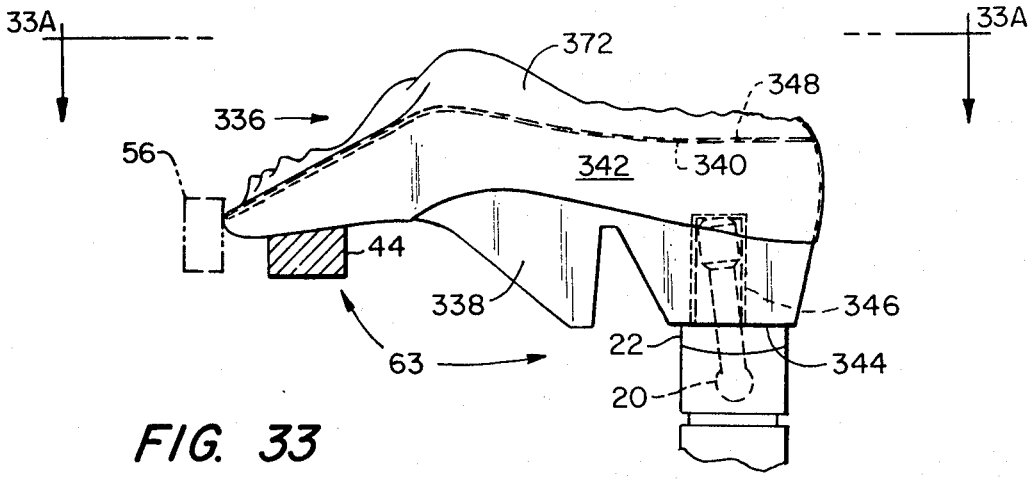
FIG. 33 is a side view of the shoe assembly as it appears in the machine at the beginning of a machine cycle.
Figure 33A:
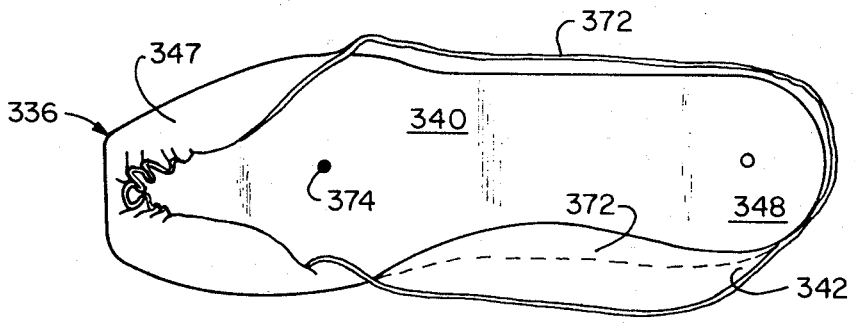
FIG. 33A is a view taken along the line 33A—33A of FIG. 33.

Pursuant to the placement of the shoe assembly 336 on the shoe assembly support 63, a valve (not shown) is shifted to so actuate the motor 32 as to retract its piston rod 34 rearwardly under the yieldable force of pressurized air to thereby yieldably move the bracket 42, together with the toe rest 44 and the detector finger 56, rearwardly with the toe rest sliding under the shoe assembly vamp until this rearward movement is terminated by the engagement of the detector finger 56 with the toe end extremity of the shoe assembly 336 as indicated in FIG. 33. The links 322, 324 and the connection 326 enables the housing 266, together with the valve bank 268 and the motor 282, to move rearwardly on the rods 262, 264 in unison with the rearward movement of the bracket 42.

In response to the engagement of the detector finger 56 with the toe end of the shoe assembly, the detector finger is swung counter-clockwise (FIG. 8) about the axis of the pin 54 to thereby cause the arm 52 to engage and shift the valve spool 62 of the valve 60. In response to this shifting of the valve 60, the hold-down 102 is caused to move forwardly over the heel portion of the shoe assembly 336 and to be lowered to a position wherein its bottom is at substantially the same elevation as the plane of the bottoms of the heel wipers 98 in the manner shown in U.S. Pat. No. 3,963,840. This is followed by an actuation of the motor 16 to project its piston rod 18 upwardly under relatively low pressure to thereby raise the bar 14, together with the shoe assembly support 63 and the detector finger 56, until the heel seat portion 348 (FIGS. 33 and 33A) of the insole bears against the bottom of the hold-down 102 to thus locate the insole heel seat portion 348 in a plane substantially level with the plane of the bottoms of the heel wipers 98 in a plane parallel to the plane of movement of the heel wipers 98.

Referring to FIGS. 4 and 5, a brake plate 350 is connected to the bar 14 for heightwise movement therewith and is located between a pair of brake arms 352 that are pivotally mounted on levers 354. The levers 354 are pivoted to the bracket 12 by means of pins 356. The back end of one of the levers 354 is pivotally connected to the piston rod of an air actuated motor 358 and the back end of the other lever 354 is pivotally connected to the cylinder of the motor 358.

In the idle condition of the machine, the motor 358 is so actuated as to cause the brake arms 352 to be spaced from the brake plate 350 so that the brake arms 352 will not interfere with the aforementioned raising of the bar 14. Pursuant to the raising of the bar 14 and the bearing of the insole heel seat portion 348 against the bottom of the hold-down 102, the motor 358 is actuated to force the brake arms 352 against the brake plate 350 to thereby lock the bar 14 and the shoe assembly support 63 in their raised positions.

Also pursuant to the raising of the bar 14 and the bearing of the insole heel seat portion 348 against the bottom of the hold-down 102, the motor 32 is actuated to relieve the rearwardly directed movement of its piston rod 34 and thus relieve the rearwardly directed force applied by the detector finger 56 against the toe end of the shoe assembly 336 and the motor 46 is actuated to lower its piston rod 48 and thereby lower the detector finger 56 out of engagement with the toe end of the shoe assembly 336. The relieving of the rearwardly directed force of the detector finger 56 against the toe end of the shoe assembly 336 enables the detector finger to move downwardly without snubbing or being caught on the toe end of the shoe assembly. However, due to inertia and the yieldable *upwardly* directed pressure applied by the toe rest 44 against the vamp of the shoe assembly 336 by the motor 38, there is no significant forward-rearward shifting of the bracket 42 and the housing 266 when the rearwardly directed movement of the piston rod 34 is relieved.

Figure 17:
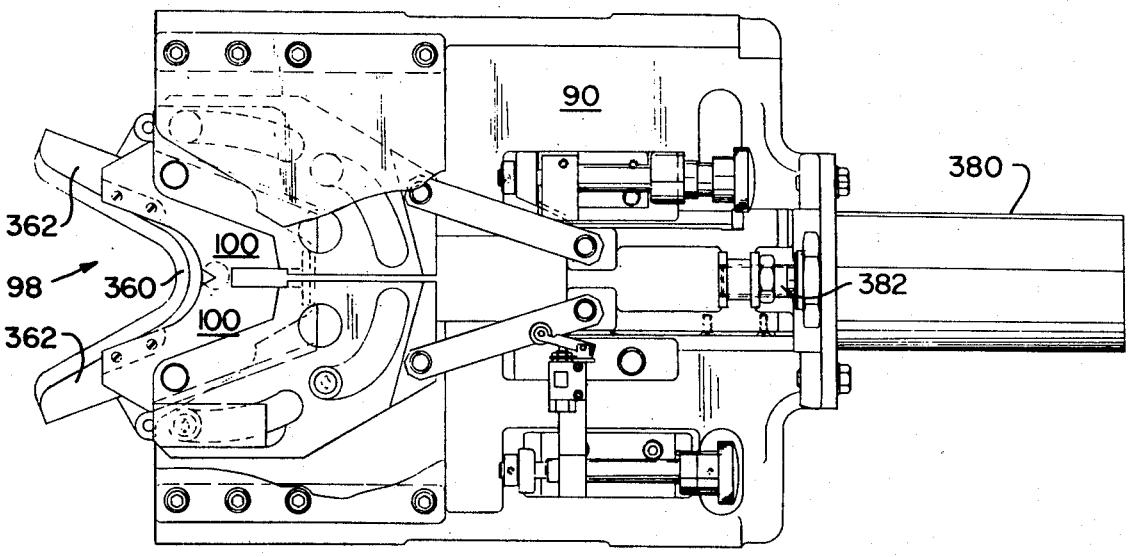
FIG. 17 is a view taken along the line 17—17 of FIG. 16.
Figure 16:
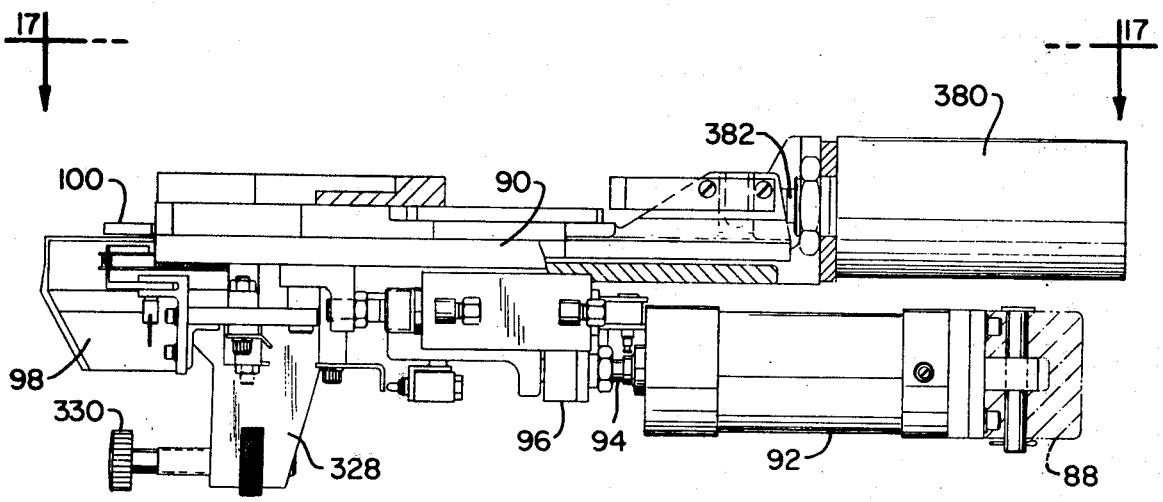
FIG. 16 is a side elevation showing instrumentalities operating on the heel portion of the shoe assembly and drive mechanisms therefor.

Also pursuant to the raising of the bar 14 and the bearing of the insole heel seat portion 348 against the bottom of the hold-down 102, the motor 92 is actuated to move its piston rod 94 forwardly to thereby move the main slide plate 90 forwardly. As shown in FIG. 17, the heel clamp 98 has a bight 360 and a pair of legs 362 extending forwardly and divergently from the bight. In the idle position of the machine, the heel clamp is held in an open position with the legs 362 spaced relatively far apart by the mechanism shown in U.S. Pat. No. 3,963,840. The forward movement of the main slide plate 90 causes concurrent forward movement of the heel clamp 98 and the heel wipers 100, this forward movement being terminated in response to the engagement of the clamp bight 360 with the heel end extremity of the shoe assembly 336 by the mechanism disclosed in U.S. Pat. No. 3,963,840 to thereby position the heel clamp 98 in a clamping position and the heel wipers in a position of readiness for wiping in a desired relationship with the heel end of the shoe assembly 336 regardless of the location of the heel end of the shoe assembly, the location of the heel end of the shoe assembly being dependent on the forward-rearward distance between the thimble 346 and the heel end of the shoe assembly. Due to the connection formed by the members 328, 330 and 332 shown in FIG. 32 between the main slide plate 90 and the sleds 80, the sleds 80, together with the side lasting instrumentalities 86, partake of the forward movement of the main slide plate with the sleds 80 moving along the rods 82. By the mechanism shown in U.S. Pat. No. 3,963,840, in response to the engagement of the clamp bight 360 with the heel end of the shoe assembly 336, the clamp legs 362 are caused to move inwardly to clamp the sides of the heel end of the shoe assembly to thereby enable the clamp 98 to clamp the entire heel end of the shoe assembly as shown in FIG. 34.

Figure 13:
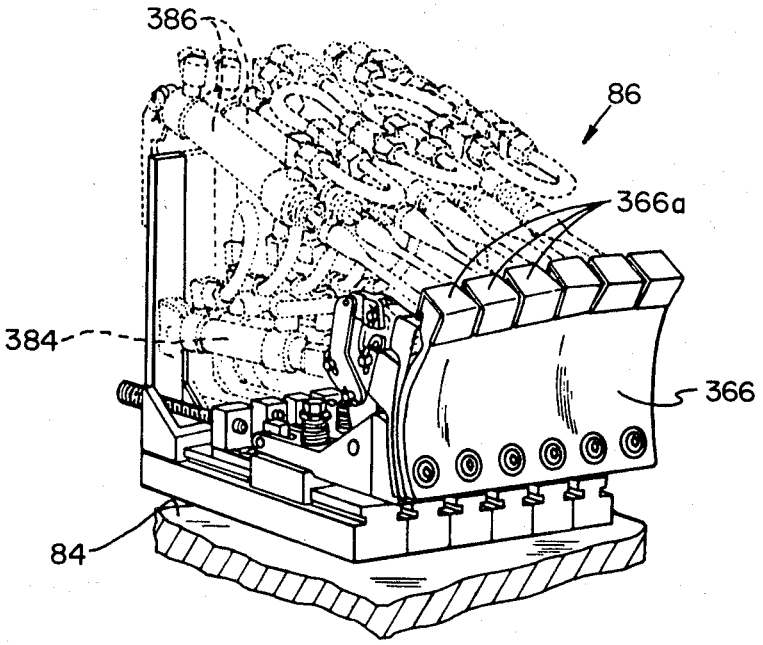
FIG. 13 is an isometric view of a side lasting instrumentality that is a part of the side lasting unit.
Figure 35:
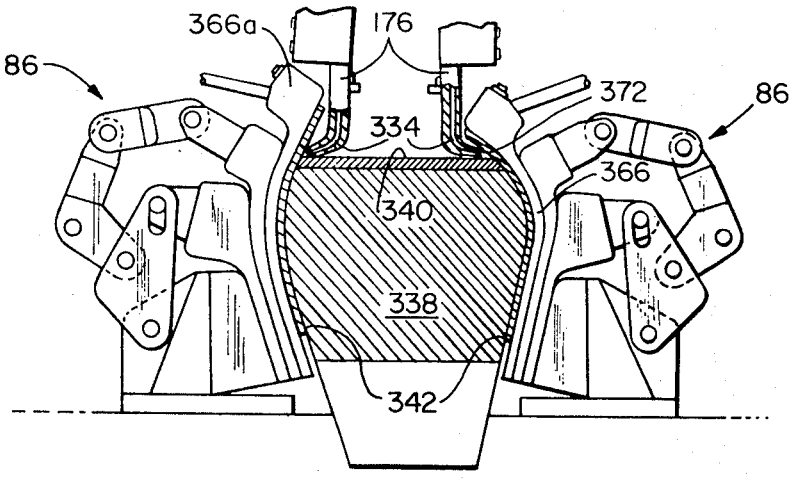
FIG. 35 is a view showing the nozzles as they appear when applying cement to the shoe assembly.

Referring to FIGS. 13 and 35, each side lasting instrumentality 86 includes a lasting strap 366 made of an elastic, flexible and deformable material such as urethane. The top of each lasting strap 366 is formed into a plurality of rigid top segments 366a.

At this time in the machine cycle, the operator momentarily shifts a pair of valves mounted at the tops of posts 370 (FIGS. 1–3) at the front of the machine. The shifting of these valves actuates the motors 68 to move the sleds 80, together with the bases 84 and the side lasting instrumentalities 86, inwardly to positions wherein the side lasting instrumentalities are close to but not in engagement with the sides of the shoe assembly 336, this inward movement being permitted by the gibs 332 moving inwardly along the rods 330. This is followed, in the manner shown in U.S. Pat. Nos. 3,775,797 and 3,862,741 by a movement of the lasting straps 366 to the position shown in FIGS. 34, 34A and 35 wherein the lasting straps are pressing the side portions of the upper 342 against the sides of the last 338 with the side portions 372 of the upper margin extending upwardly of the insole 340 and being folded partway towards the insole by the top segments 366a.

Figure 34A:
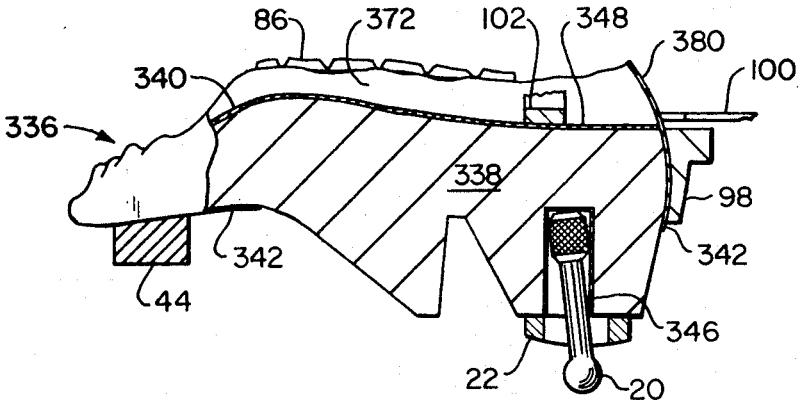
FIG. 34A is a section taken along the line 34A—34A of FIG. 34.
Figure 34:
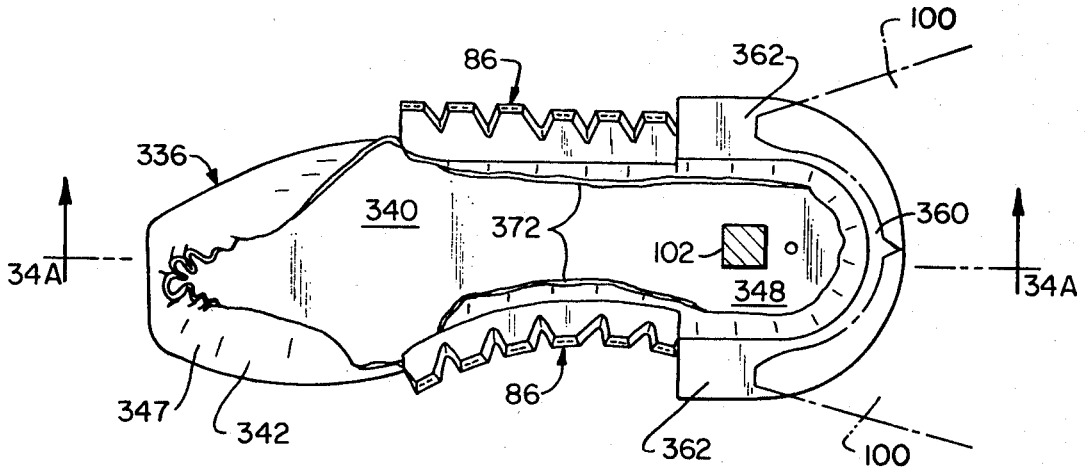
FIG. 34 is a plan view of the shoe assembly as it appears in the machine after the side and heel portions of the upper have been clamped to the last.

The shoe assembly engaging parts are now in the position shown in FIGS. 34 and 34A with the heel clamp 98 pressing the heel portion of the upper 342 against the last 338 and the side lasting instrumentalities 86 pressing the side portions of the upper against the last.

The momentary shifting of the valves in the posts 370 also so actuates the motor 310 as to force the brake pads 306 against the tail 294 and thus lock the housing 266, the valve bank 268 and the motor 282 in the position they had assumed pursuant to the engagement of the detector finger 56 with the toe end extremity of the shoe assembly 336.

The momentary shifting of the valves in the posts 370 also so actuates the motor 126 as to project its piston rod 128 forwardly to thus move the plate 120 and the parts carried thereby, including the nozzles 176, forwardly with the now raised nozzles moving over the hold-down 102. The plate [102] *120* continues its forward movement until the cam 320 engages the piston rod 284, the cam 320 intersecting the valve actuator 280 to shift the valve 274 just before it engages the piston rod 284. During the forward movement of the plate 120, the hold-down 103 is raised from the shoe assembly 336 and is moved rearwardly to its idle position in the manner shown in U.S. Pat. No. 3,963,840 to prevent interference between the hold-down and the nozzles 176 during the below described rearward cement applying movement of the nozzles. The heightwise position of the shoe assembly 336 is not affected by the disengagement of the hold-down 102 from the shoe assembly due to the aforementioned locking of the bar 14 against heightwise movement by the actuation of the motor 358.

The return of the hold-down 102 to its idle position causes a valve to shift. Pursuant to the shifting of this valve and of the valve 274, the motors 190 are actuated to retract their piston rods 194 rearwardly under the forces of pressurized air and thus cause the nozzles 176 to be yieldably lowered until they engage the insole 340 in the general region indicated by the number 374 in FIG. 33A wherein the nozzles 176 are spaced from the upper margin and the insole periphery laterally of the side portions of the upper margin and the insole periphery that are between the toe and heel portions of the shoe assembly 336 and that are rearward and heelward of the boundaries between the previously lasted toe portion 347 of the upper margin and the unlasted side portions 372 of the upper margin. This desired location of the position of engagement 374 of the nozzles 176 with the insole 340 is accomplished automatically regardless of the length of the shoe assembly 336 and regardless of the forward-rearward distance between the last thimble 346 and the toe end extremity of the shoe assembly due to the forward-rearward position of the housing 266, and thus of the valve 274 and the valve actuator 280, being determined by the position of engagement of the detector finger 56 with the toe end extremity of the shoe assembly 336.

The lowering of the nozzles 176 causes the plungers 202 to shift the valves 204. The shifting of the valves 204 shuts off the flow of pressurized air to the motors 210 so that the return springs of these motors retract the heads 214 out of engagement with the stabilizer bolts 208 to thereby enable the motor [180] *182* to move the nozzles 176 outwardly. The shifting of the valves 204 also so actuates the motor [180] *182* as to move its cylinder 180 and piston rod 184 away from each other and thus move the nozzles 176 outwardly under the yieldable force of pressurized air into the angles between the insole 340 and the upper margin side portions 372 until the nozzles reach the corners between the insole and the upper margin side portions as indicated in FIG. 35.

The shifting of the valves 204 also actuates a pneumatic timer, which after the lapse of a predetermined time period, actuates the motor 282 to retract its piston rod 284 in a forward direction until the piston 290 engages the stop pin 286. The motor 126 is therefore able to impart a resumption of forward movement of the plate 120, together with the nozzles 176, an amount that is equal to the amount of retraction of the piston rod 284 in the motor 282 when the cam 320 again engages the piston rod 284 to again stop forward movement of the plate 120 and the nozzles 176. During this resumption of forward movement of the nozzles 176, the nozzle tips 334 are resiliently urged outwardly against the side portions 372 of the upper margin by the motor 182 and are resiliently urged downwardly against the insole 340 by the motors 190 so that they are being urged into the corner between the upper margin side portions 372 and the insole 340 when this resumption of forward movement is terminated. The shoe assembly is so constructed and the stop pin is so located in the motor 282 that the nozzle tips 334 are at the boundaries between the lasted toe portion 347 and the unlasted side portions 372 of the upper margin when the resumption of forward movement of the nozzles 176 is terminated.

The pneumatic timer actuated by the shifting of the valves 204, after the lapse of said predetermined time period, also actuates the motor 242 to project its piston rod 246 to thereby raise the valve bank 226 about the pivot pin 228 to bring the valve actuators 236, 238 and 240 respectively into registry with the cams 252, 254 and 256 and to bring the latch 258 into registry with the detent 260.

Pursuant to the aforementioned resumption of forward movement of the plate 120, the cams 316 and 318 respectively engage the valve actuators 276 and 278 to thereby respectively shift the valves 270 and 272. The shifting of the valve 270 actuates the motor 126 to retract its piston rod 128 to thereby move the plate 120, together with the nozzles 176, rearwardly. The shifting of the valve 272 actuates the motor 146 to project its piston rod 148 and thus move the plunger 150 downwardly and force molten cement out of the nozzle tips 334 into the angles between the side portions 372 of the upper margin and the side peripheries of the insole 340. The downward movement of the plunger 150 cuts off communication between the chamber 136 and the bore 137 through the passage 140. The pressures generated pursuant to the downward movement of the plunger 150 causes a ball 376 (FIG. 19) that normally sits on a pin 378 to rise and seat against the valve 142 to thereby cut off communication between the chamber 136 and the bore 137 through the valve 142 and the passage 144. The plate 120, together with the nozzles 176, continues its rearward movement until the detent 260 engages the latch 258.

The nozzle tips [234] *334* continue to be urged into the corners formed by the upper margin and the insole periphery from the boundaries between the lasted toe portion 347 of the upper margin and the unlasted side portions 372 of the upper margin to the heel end extremity of the upper margin during their rearward movement in the manner shown in U.S. Pat. No. 3,901,181, with the motors 172 being actuated to swing the nozzles 176 heelwardly about the axes of the pivotal mounting of the nozzle holders 170 to the nozzle carriers 166 pursuant to the shifting of the valve 230 by the engagement of the cam 252 with the valve actuator 236.

During this rearward movement of the nozzles 176, the cam 256 engages the valve actuator 240 to shift the valve 234. The shifting of the valve 234 causes actuation of the motor 180 to swing the nozzles 176 inwardly and towards each other when the nozzles are proximate to the heel end extremity of the heel portion 380 (FIG. 34A) of the upper margin for the purposes set forth in U.S. Pat. No. 3,901,181.

The engagement of the detent 260 with the latch 258 terminates the rearward movement of the plate 120 and the concurrent rearward cement applying movement of the nozzles 176. The aforementioned forward movement of the main slide plate 90 to bring the clamp bight 360 into engagement with the heel end of the shoe assembly 336 had also, through the connection between the main slide plate 90 and the housing 220 by the brace 216 and the mount 218, moved the latch 258 and the valve bank 226 forwardly so that the latch 258 and the valve bank 226 are located in forward-rearward positions that are dependent on the forward-rearward position of the heel end of the shoe assembly 336, thus ensuring that the nozzles terminate their rearward movement at the heel end of the shoe assembly and also ensuring that the valves 230 and 234 are located in the proper positions to ensure that the operations described above that are performed pursuant to the shifting of these valves take place in a desired relationship to the heel end of the shoe assembly.

It is desirable that a uniform quantity of cement be applied in the corner between the side and heel portions of the upper margin and the insole periphery during the heelward movement of the nozzles 176 so that, during the below described side and heel wiping operations, there will be an adequate amount of cement to enable the side and heel portions of the upper margin to be bonded to the insole pursuant to the side and heel wiping operations and so that there will not be an excess of cement applied which would cause the cement to be squeezed out inwardly of the side and heel portions of the upper margin onto the exposed insole pursuant to the side and heel wiping operations. When the motor 126 is actuated to cause rearward movement of the slide 120 and the nozzles 176, the nozzles commence their rearward movement at a relatively slow speed before the motor 126 can cause the rearward movement of the nozzles to accelerate to a desired speed. Therefore if the motor 146 causes cement to be extruded from the nozzles 176 at the same rate during the entire rearward cement applying movement of the nozzles there would either be an excess of cement applied when the nozzles are moving rearwardly relatively slowly at the commencement of their cement applying movement or there would be an inadequate amount of cement applied when the nozzles have accelerated so as to move rearwardly at a relatively high speed. In order to overcome this drawback, at the commencement of the rearward cement applying movement of the nozzles 176, pressurized air passes to the head end of the motor 146 through a regulator set at a relatively low pressure to thereby cause the plunger 150 to move downwardly at a relatively low speed and thus cause the cement to be extruded through the nozzle tips 334 at a relatively low rate. Pursuant to the rearward cement applying movement of the nozzles 176, the cam 254 engages the valve actuator 238 to thereby shift the valve 232, this valve remaining shifted during the remainder of the rearward cement applying movement of the nozzles 176. The shifting of the valve 232 cuts off the flow of pressurized air to the head end of the motor 146 through the regulator set at the relatively low pressure and instead causes pressurized air to pass to the head end of the motor 146 through a regulator set at a relatively high pressure to thereby cause the plunger 150 to move downwardly at a relatively high speed and cause the cement to be extruded through the nozzle tips 334 at a relatively high rate.

The aforementioned shifting of the valve 240 by the cam 256 causes actuation of a second pneumatic timer and a third pneumatic timer. After the lapse of a predetermined period of time, the actuation of the second pneumatic timer causes actuation of the motor 146 to retract its piston rod 148 to its idle position and thus terminate the extrusion of cement through the nozzle tips 334.

After the lapse of a predetermined length of time, the actuation of the third pneumatic timer actuates the motors 190 to project their piston rods 194 and thereby raise the nozzles 176 to their idle positions.

The actuation of the third pneumatic timer, after the lapse of the predetermined length of time referred to in the preceding paragraph, simultaneously causes an inward wiping movement of the side lasting instrumentalities 86 in the manner disclosed in U.S. Pat. No. 3,963,840 and a forward and inward movement of the heel wipers 100 in a heel wiping stroke also in the manner disclosed in U.S. Pat. No. 3,963,840 to thereby cause the side lasting instrumentalities and the heel wipers to respectively wipe or fold the side and heel portions of the upper margin against the insole and bond these wiped margin portions to the insole by means of the previously applied cement. During these wiping movements, the side lasting instrumentalities 86 and the heel wipers 100 come close to each other but do not impinge on each other regardless of the position that the heel wipers assumed at the termination of the aforementioned forward movement of the main slide plate 90 due to the side lasting instrumentalities 86 partaking of the forward movement of the main slide plate 90 by virtue of the connection formed by the members 328, 330 and 332 between the main slide plate 90 and the side lasting instrumentalities 86. Therefore, regardless of any change in the length of the shoe assembly 336 and regardless of any change in the forward-rearward distance between the thimble 346 and the heel end extremity between two succeeding shoe assemblies presented to the machine, there is no need to manually adjust the forward-rearward position of the side lasting instrumentalities 86 relative to the heel wipers 100 between the machine cycles for the two succeeding shoe assemblies. During the side wiping operations by the side lasting instrumentalities 86, the upward yielding of the toe rest 44 by the motor 38 coacts with the side lasting instrumentalities 86 in the manner shown in U.S. Pat. No. 3,962,741. The detector finger 56 was lowered out of engagement with the toe end extremity of the shoe assembly 336 prior to the side wiping operation to prevent interference between the detector finger and the side lasting instrumentalities 86 during the side wiping operation, this interference being most likely to take place if the detector finger is not so lowered when operating on relatively short shoe assemblies.

At or near the end of the heel wiping stroke, the motor 358 is so actuated as to cause the brake arms 352 to disengage the brake plate 350 and thus unlock the support 63 for heightwise movement. At about the same time, air is introduced under increased bedding pressure to the motor 16 to cause the support 63 to be so forced upwardly as to press the wiped side and heel portions of the upper margin against the side lasting instrumentalities 86 and the heel wipers 98 under increased bedding pressure to thereby flatten the wiped side and heel portions of the upper margin and enhance the bond between these margin portions and the insole. When this bedding pressure has been applied for a desired length of time, the motor 242 is actuated to retract its piston rod 246 so that the latch 258 is lowered out of engagement with the detent 260 and the valve bank 226 is lowered out of engagement with the cam bank 250 thus enabling the motor 126 to resume the rearward movement of the plate 120 and the nozzles 176 to return them to their idle positions and the other parts that have not already done so are returned to their idle positions. The machine cycle is now completed and the lasted shoe assembly 336 is removed from the machine.

There follows a recapitulation of the description of the machine parts and the mode of operation of the machine that are pertinent to this invention.

With respect to a first aspect of the invention, the machine is operable on the shoe assembly 336 that is formed of the last 338 having the insole 340 located on its bottom and the upper 342 mounted thereon with the toe portion 347 of the upper margin being wiped against and secured to the insole and unwiped portions 372 of the upper margin extending heelwardly of said wiped upper margin portion and the machine has the function of applying cement in the corners between said unwiped margin portions and the corresponding portions of the insole periphery. The machine comprises the shoe assembly support 63 for supporting the shoe assembly 336 bottom-up with the toe end of the shoe assembly facing forwardly. The pair of nozzles 176, located above the shoe assembly 336, are mounted for forward-rearward movement[, for heightwise movement, and for inward-outward movement]. *The cement pumping mechanism 132 acts as means operable to extrude cement from the nozzles 176 into said corners. A detector member, constituted by the finger 56, is mounted for forward-rearward movement.* The piston rod 284 constitutes a stop member [that is located in a particular location]. *The rods 262, 264 movably mounting the stop member 284 and the links 322, 324 connecting the stop member 284 to the detector member 56 constitute means so mounting the stop member 284 and so connecting the stop member to the detector member as to cause the stop member to have forward-rearward movement in unison with the detector member.* The cam 320 constitutes an engaging member, mounted for forward-rearward movement in unison with the nozzles 176, that is located rearwardly of the stop member 284 in intersecting relationship with the stop member. The [motors] *motor* 126[, 190, and 182 respectively act] *acts* as means for initially retaining the nozzles 176 in rearward[, upper, and inner] positions. *The motor 32 acts as means for initially locating the detector member 56 in a forward position that is forward of the toe end extremity of the shoe assembly 336 and also acts as means for thereafter yieldably moving the detector member 56, together with the stop member 284, rearwardly to bring the detector member into engagement with the toe end extremity of the shoe assembly.* The motor 126 constitutes means for thereafter moving the nozzles 176, together with the engaging member 320, forwardly until the engaging member 320 engages the stop member 284. The motors 190 and 182 [respectively] constitute means for [thereafter effecting lowering and outward movements of] *maintaining* the nozzles 176 [to move the nozzles into] *in* said corners [heelwardly of] *during at least the latter part of the forward movements of the nozzles 176, the intersection of the engaging member 320 with the stop member 284 placing the nozzles 176 in the corners at* the boundaries between said wiped and unwiped margin portions. [The motor 282 acts as means for thereafter removing the stop member 284 from said particular location to enable the nozzles 176 to resume their forward movement so as to being the nozzles to said boundaries.] The [motors] *motor* 126[, 190 and 182 act] *acts* as means [operative when the nozzles 176 have arrived at said boundaries to effect rearward movement of] *for thereafter moving* the nozzles [while maintaining the nozzles in said corners. The cement pumping mechanism 132 acts as means for extruding cement from the nozzles 176 into said corners during said rearward movements of the nozzles.] *rearwardly.*

[The machine described in the preceding paragraph is improved, in accordance with this invention, by comprising a detector member, constituted by the finger 56, that is mounted for forward-rearward movement. The rods 262, 264 movably mounting the stop member 284 and the links 322, 324 connecting the stop member 284 to the detector member 56 constitute means so mounting the stop member 284 and so connecting the stop member to the detector member 56 as to cause the stop member to have forward-rearward movement in unison with the detector member. The motor 32 acts as means for initially locating the detector member 56 in a forward position that is forward of the toe end extremity of the shoe assembly 336 and also acts as means, operative prior to the forward movement of the nozzles 176 first mentioned in the preceding paragraph, for yieldably moving the detector member 56, together with the stop member 284, rearwardly to bring the detector member into engagement with the toe end extremity of the shoe assembly and to thereby bring the stop member to said particular location.]

[The means mounting the stop member 284 and connecting the stop member to the detector member 56 comprises the housing 266, herein referred to as a back housing, to which the stop member is mounted, the back housing 266 being mounted for forward-rearward movement, and the connection formed by the links 322, 324 between the detector member 56 and the back housing 266 enabling the detector member and the back housing to have unitary forward-rearward movement. The stop member 284 is mounted to the back housing 266 for forward movement from a rearward stop member position that is determinative of said particular location to a forward stop member position that is in intersecting relationship with the engaging member 320. The means for removing the stop member 284 from said particular location comprises the motor 282 which acts as means for moving the stop member from said rearward stop member position to said forward stop member position, the intersection of the engaging member 320 with the stop member 284 during the resumption of the forward movement of the nozzles 176, referred to in the preceding paragraph, when the stop member 284 is in said forward stop member position being determinative of the arrival of the nozzles 176 at said boundaries.]

The shoe assembly support 63 comprises the last pin 20 and the support plate 22, which constitute a back support element for supporting the backpart of the shoe assembly 336, and the toe rest 44, which constitutes a front support element for supporting the forepart of the shoe assembly 336. The housing 30, hereafter referred to as a front housing, is located forwardly of the back support element 20, 22 and is mounted for forward-rearward movement and the front support element 44 is mounted to the front housing 30. The detector member 56 is mounted to the front housing 30 and is located forwardly of and extends upwardly of the front support element 44. The motor 32, which acts as means for yieldably moving the detector member 56 rearwardly, is a yieldable force applying drive mechanism that is connected to the front housing 30. The connection formed by the links 322, 324 is between the front housing 30 and the [back] housing 266, *which is a back housing,* and enables the two housings to have unitary forward-rearward movement.

[With respect to a second aspect of the invention, the machine is operable on the shoe assembly 336 that is formed of the last 338 having the insole 340 located on its bottom and the upper 342 mounted thereon. The shoe assembly support 63 supports the shoe assembly 336 bottom-up with the toe end of the shoe assembly facing forwardly and with the side and heel portions of the upper margin extending upwardly of the insole. The main slide plate 90, located rearwardly of the support 63, is mounted for forward-rearward movement. The heel wipers 100 constitute heel wiping means that are mounted to the slide plate 90 for forward movement with respect to this slide plate in a heel wiping stroke from a retracted position wherein the heel wiping means 100 is in a position in readiness for wiping to an advanced position wherein the heel wiping means 100 has wiped the heel portion of the upper margin against the corresponding portion of the insole periphery. The heel clamp bight 360 constitutes a shoe assembly engaging member that is mounted to the slide plate 90 below the heel wiping means 100. The lasting straps 366 constitute side wiping means, located on each side of the support 63, that are each mounted for inward movement from a position of disengagement with the shoe assembly 336 through a side wiping stroke to an inner position wherein the side wiping means 366 has wiped a side portion of the upper margin against a corresponding portion of the insole periphery. The motor 92 acts as means for initially maintaining the slide plate 90 in a rearward position. The heel wiping means 100 is initially maintained in its retracted position by an air operated motor 380 (FIGS. 16 and 17) being so actuated as to retract its piston rod 382 in the manner shown in U.S. Pat. No. 3,963,840. The motor 92 is thereafter so actuated as to provide means for thereafter moving the slide plate 90 forwardly until the shoe assembly engaging member 360 engages the heel end extremity of the shoe assembly. The motor 380 is thereafter so actuated as to project its piston rod 382 and thereby, in the manner shown in U.S. Pat. No. 3,963,840, act as means for imparting a heel wiping stroke to the heel wiping means 100. The projection of the piston rods 70 out of the motors 68 constitutes means for initially maintaining each side wiping means 366 in its position of disengagement. Motors 384 and 368 (FIG. 13) are thereafter so actuated as to constitute means for imparting said side wiping stroke to each of said side wiping means 366 in the manner shown in U.S. Pat. Nos. 3,775,797; 3,962,741 and 3,963,840.]

[The machine described in the preceding paragraph is improved, in accordance with this invention, by comprising connecting means, constituted by the rods 82, mounting each side wiping means 366 for forward-rearward movement and means, constituted by the members 328, 330 and 332, so connecting each side wiping means 366 to the slide plate 90 as to cause forward movement of the side wiping means 366 concomitantly with said forward movement of the slide plate 90 whereby the heel wiping stroke and the side wiping strokes may be performed simultaneously regardless of the position of engagement of the shoe assembly engaging member 360 with the heel end extremity of the shoe assembly 336.]

[In accordance with the second aspect of the invention, the machine incorporates the sled 80 located on each side of the support 63 with each side wiping means 366 being mounted to its associated sled for inward-outward movement to thereby provide said mounting for inward-outward movement of the side wiping means. The motors 68 constitute means for initially maintaining each sled 80 in an outer position to thereby place each side wiping means 366 in a relatively remote position from the support 63 to permit placement of the shoe assembly 336 on the support 63. The motors 68 also act as means for thereafter moving each sled 80 inwardly to thereby place each side wiping means 366 in its position of disengagement. In accordance with this invention, the machine has the improvement wherein the connecting means comprises the connecting member in the form of the rod 330 associated with each sled 80 that is rigidly connected to the slide plate 90 and is so connected to its associated sled 80 as to permit inward-outward movement of its associated sled.]

*In the embodiment of the first aspect of the invention herein disclosed, the nozzles 176, in addition to being mounted for forward-rearward movement, are mounted for heightwise movement and for inward-outward movement. The stop member 284 is located in a particular location. The motors 190 and 182 respectively act as means for initially retaining the nozzles 176 in upper and inner positions and also constitute means, operative after the motor 126 has moved the nozzles 176, togehter with the engaging member 320, forwardly until the engaging member 320 engages the stop member 284, for effecting lowering and outward movements of the nozzles 176 to move the nozzles into said corners heelwardly of said boundaries. The motor 282 acts as means for thereafter removing the stop member 284 from said particular location to enable the nozzles 176 to resume their forward movements so as to bring the nozzles to said boundaries. The motors 126, 190 and 182 act as means operative when the nozzles 176 have arrived at said boundaries to effect rearward movements of the nozzles while maintaining the nozzles in said corners. The cement extruding means 132 extrudes cement from the nozzles 176 into said corners during said rearward movement of the nozzles.*

*The means mounting the stop member 284 and connecting the stop member to the detector member 56 comprises the back housing 266, to which the stop member is mounted, the back housing being mounted for forward-rearward movement, and the connection formed by the links 322, 324 between the detector member 56 and the back housing 266 enabling the detector member and the back housing to have unitary forward-rearward movement. The stop member 284 is mounted to the back housing 266 for forward movement from a rearward stop member position that is determinative of said particular location to a forward stop member position that is in intersecting relationship with the engaging member 320. The means for removing the stop member 284 from said particular location comprises the motor 282 which acts as means for moving the stop member from said rearward stop member position to said forward stop member position, the intersection of the engaging member 320 with the stop member 284 during the resumption of the forward movements of the nozzles 176, referred to in the preceding paragraph, when the stop member is in said forward stop member position being determinative of the arrival of the nozzles 176 at said boundaries.*

With respect to a [third] *second* aspect of the invention, the machine incorporates a mechanism for applying a substantially uniform quantity of cement along the surface of a workpiece. This mechanism includes the nozzle 176 mounted for movement from a starting position to a final position along the workpiece and the motor 126 connected to the nozzle operable to effectuate said nozzle movement. The motor 126 has controls that act as means for initially causing the motor to maintain the nozzle 176 in said starting position and means for thereafter operating the motor to effect said nozzle movement. The cement pumping mechanism 132 constitutes means for extruding cement from the nozzle 176 during said nozzle movement.

In accordance with the [third] *second* aspect of the invention, the mechanism described in the preceding paragraph has the improvement that includes first extrusion rate control means, effective at the beginning of the nozzle movement when the motor 126 is moving the nozzle 176 at a relatively slow speed, to cause the extruding means 132 to extrude the cement from the nozzle at a relatively slow rate and second extrusion rate control means, operable after the nozzle 176 has moved a prescribed distance from its starting position that is less than the distance from its starting position to its final position at which time the motor 126 is moving the nozzle at a relatively high speed, to cause the extruding means 132 to extrude the cement from the nozzle at a relatively high rate.

The cement applying mechanism includes the cam 254 which acts as an actuating member and the valve 232 which acts as a control member, the control member 232 being so located in intersecting relationship with the actuating member 254 as to be intersected by the actuating member when the nozzle 176 has moved through said prescribed distance. The cement applying mechanism also includes a control that acts as means responsive to the intersection of the actuating member 254 with the control member 232 for operating said second extrusion rate control means.

The extruding means 132 includes the motor 146 which functions as a fluid pressure operated pump. The first extrusion rate control means comprises means for causing pressurized fluid to pass to the pump 146 to operate the pump at a relatively low pressure and the second extrusion rate control means comprises means for causing pressurized fluid to pass to the pump 146 to operate the pump at a relatively high pressure.

We claim:

1. A machine, operable on a shoe assembly formed of a last having an insole located on its bottom and an upper mounted thereon with the toe portion of the upper margin being wiped against and secured to the insole and unwiped portions of the upper margin extending heelwardly of said wiped upper margin portion, for applying cement in the corners between said unwiped margin portions and the corresponding portions of the insole periphery compising: a shoe assembly support for supporting the shoe assembly bottom-up with the toe end of the shoe assembly facing forwardly; a pair of nozzles, located above the shoe assembly, mounted for forward-rearward movement, for heightwise movement, and for inward-outward movement; a stop member located in a particular location; an engaging member, mounted for forward-rearward movement in unison with the nozzles, located rearwardly of the stop member in intersecting relationship with the stop member; means for initially retaining the nozzles in rearward, upper and inner positions; means for thereafter moving the nozzles, together with the engaging member, forwardly until the engaging member intersects the stop member; means for thereafter effecting lowering and [outboard] *outward* movements of the nozzles to move the nozzles into said corners heelwardly of the boundaries between said wiped and unwiped upper margin portions; means for thereafter removing the stop member from said particular location to enable the nozzles to resume their forward movement so as to bring the nozzles to said boundaries; means operative when the nozzles have arrived at said boundaries to effect rearward movement of the nozzles while maintaining the nozzles in said corners; and means for extruding cement from the nozzles into said corners during said rearward movements of the nozzles; the machine having the improvement comprising: a detector member mounted for forward-rearward movement; means so mounting the stop member and so connecting the stop member to the detector member as to cause the stop member to have forward-rearward movement in unison with the detector member; means for initially locating the detector member in a forward position that is forward of the toe end extremity of the shoe assembly; and means, operative prior to said first mentioned forward movement of the nozzles, for yieldably moving the detector member, together with the stop member, rearwardly to bring the detector member into engagement with the toe end extremity of the shoe assembly and to thereby bring the stop member to said particular location.

2. The machine of claim 1 wherein said means mounting the stop member and connecting the stop member to the detector member comprises: a back housing, to which the stop member is mounted, mounted for forward-rearward movement; and a connection between the detector member and the back housing enabling the detector member and the back housing to have unitary forward-rearward movement; wherein said stop member is mounted to the back housing for forward movement from a rearward stop member position that is determinative of said particular location to a forward stop member position that is in intersecting relationship with the engaging member; and wherein said means for removing the stop member from said particular location comprises means for moving the stop member from said rearward stop member position to said forward stop member position, the intersection of the engaging member with the stop member during said resumption of the forward movement of the nozzles when the stop member is in said forward stop member position being determinative of the arrival of the nozzles at said boundaries.

3. The machine of claim 1 wherein said shoe assembly support comprises: a back support element for supporting the backpart of the shoe assembly; a front housing located forwardly of the back support element mounted for forward-rearward movement; and a front support element for supporting the forepart of the shoe assembly mounted to the front housing; wherein said detector member is mounted to the front housing and is located forwardly of and extends upwardly of the front support element; wherein said means for yieldably moving the detector member rearwardly comprises a yieldable force applying drive mechanism connected to the front housing; and wherein said means mounting the stop member and connecting the stop member to the detector member comprises: a back housing, to which the stop member is mounted, mounted for forward-rearward movement; and a connection between the front housing and the back housing enabling the two housings to have unitary forward-rearward movement.

4. The machine of claim 3 wherein said stop member is mounted to the back housing for forward movement from a rearward stop member position that is determinative of said particular location to a forward stop member position that is in intersecting relationship with the engaging member; and wherein said means for removing the stop member from said particular location comprises means for moving the stop member from said rearward stop member position to said forward stop member position, the intersection of the engaging member with the stop member during said resumption of the forward movement of the nozzles when the stop member is in said forward stop member position being determinative of the arrival of the nozzles at said boundaries.

5. A machine, operable on a shoe assembly formed of a last having an insole loated on its bottom and an upper mounted thereon with the toe portion of the upper margin being wiped against and secured to the insole and unwiped portions of the upper margin extending heelwardly of said wiped upper margin portion, for applying cement in the corners between said unwiped margin portions and the corrresponding portions of the insole periphery comprising: a shoe assembly support for supporting the shoe assembly bottom-up with the toe end of the shoe assembly facing forwardly; a pair of nozzles, located above the shoe assembly, mounted for forward-rearward movement, for heightwise movement, and for inward-outward movement; a housing; a stop member, mounted to said housing, located in a particular location; an engaging member, mounted for forward-rearward movement in unison with the nozzles, located rearwardly of the stop member in intersecting relationship with the stop member; means for initially retaining the nozzles in rearward, upper, and inner positions; means for thereafter moving the nozzles, together with the engaging member, forwardly until the engaging member intersects the stop member; means for thereafter effecting lowering and outward movement of the nozzles to move the nozzles into said corners heelwardly of the boundaries between said wiped and unwiped upper margin portions; means for thereafter removing the stop member from said particular location to enable the nozzles to resume their forward movement so as to bring the nozzles to said boundaries; means operative when the nozzles have arrived at said boundaries to effect rearward movement of the nozzles while maintaining the nozzles in said corners; and means for extruding cement from the nozzles into said corners during said rearward movement of the nozzles; the machine having the improvement wherein said stop member is mounted to the housing for forward movement from a rearward stop member position that is determinative of said particular location to a forward stop member position that is in intersecting relationship with the engaging member; and wherein said means for removing the stop member from said particular location comprises means for moving the stop member from said rearward stop member position to said forward stop member position, the intersection of the engaging member with the stop member during said resumption of the forward movement of the nozzles when the stop member is in said forward stop member position being determinative of the arrival of the nozzles at said boundaries.

6. A mechanism for applying a substantially uniform quantity of cement along the surface of a workpiece comprising: a nozzle mounted for movement from a starting position to a final position along the workpiece; a motor connected to the nozzle operable to effectuate said nozzle movement; means for initially causing the motor to maintain the nozzle stationary in said starting position; means for thereafter operating the motor to effect said nozzle movement; and extruding means for extruding cement from the nozzle during said nozzle movement; the mechanism having the improvement comprising: first extrusion rate control means, effective at the beginning of the nozzle movement when the motor is moving the nozzle at a relatively slow speed, to cause the extruding means to extrude the cement from the nozzle at a relatively slow rate; and second extrusion rate control means, operable after the nozzle has moved a prescribed distance from its starting position that is less than the distance from its starting position to its final position at which time the motor is moving the nozzle at a relatively high speed, to cause the extruding means to extrude the cement from the nozzle at a relatively high rate.

7. The mechanism of claim 6 comprising: an actuating member mounted for movement with the nozzle; a control member so located in intersecting relationship with the actuating member as to be intersected by the actuating member when the nozzle has moved through said prescribed distance; and means responsive to the intersection of the actuating member with the control member for operating said second extrusion rate control means.

8. The mechanism of claim 6 wherein said extruding means comprises a fluid pressure operated pump; wherein said first extrusion rate control means comprises means for causing pressurized fluid to pass to the pump to operate the pump at a relatively low pressure; and wherein said second extrusion rate control means comprises means for causing pressurized fluid to pass to the pump to operate the pump at a relative high pressure.

9. The mechanism of claim 8 comprising: an actuating member mounted for movement with the nozzle; a control member so located in intersecting relationship with the actuating member as to be intersected by the actuating member when the nozzle has moved through said prescribed distance; and means responsive to the intersection of the actuating member with the control member for operating said second extrusion rate control means.

*10. A machine, operable on a shoe assembly formed of a last having an insole located on its bottom and an upper mounted thereon with the toe portion of the upper margin being wiped against and secured to the insole and unwiped portions of the upper margin extending heelwardly of said wiped upper margin portion, for applying cement in the corners between said unwiped margin portions and the corresponding portions of the insole periphery comprising: a shoe assembly support for supporting the shoe assembly bottom-up with the toe end of the shoe assembly facing forwardly; a pair of nozzles, located above the shoe assembly, mounted for forward-rearward movement; means operable to extrude cement from the nozzles into said corners; a detector member mounted for forward-rearward movement; a stop member; means so mounting the stop member and so connecting the stop member to the detector member as to cause the stop member to have forward-rearward movement in unison with the detector member; an engaging member, mounted for forward-rearward movement in unison with the nozzles, located rearwardly of the stop member in intersecting relationship with the stop member; means for initially locating the nozzles in rearward positions; means for initially locating the detector member in a forward position that is forward of the toe end extremity of the shoe assembly; means for thereafter yieldably moving the detector member, together with the stop member, rearwardly to bring the detector member into engagement with the toe end extremity of the shoe assembly; means for thereafter moving the nozzles, together with the engaging member, forwardly until the engaging member intersects the stop member; means for maintaining the nozzles in said corners during at least the latter part of the forward movements of the nozzles, the intersection of the engaging member with the stop member placing the nozzles in said corners at the boundaries between said wiped and unwiped margin portions; and means for thereafter moving the nozzles rearwardly.*

*11. The machine of claim 10 wherein said shoe assembly support comprises: a back support element for supporting*

*the backpart of the shoe assembly; a front housing, located forwardly of the back support element, mounted for forward-rearward movement; and a front support element for supporting the forepart of the shoe assembly mounted to the front housing; wherein said detector member is mounted to the front housing and is located forwardly of and extends upwardly of the front support element; wherein said means for yieldably moving the detector member rearwardly comprises a yieldable force applying drive mechanism connected to the front housing; and wherein said means mounting the stop member and connecting the stop member to the detector member comprises: a back housing, to which the stop member is mounted, mounted for forward-rearward movement; and a connection between the front housing and the back housing enabling the two housings to have unitary forward-rearward movement.*

* * * * *